(12) United States Patent
Ishibashi et al.

(10) Patent No.: US 9,949,352 B2
(45) Date of Patent: Apr. 17, 2018

(54) ILLUMINATING DEVICE

(71) Applicant: Valeo Japan Co., Ltd., Saitama (JP)

(72) Inventors: Masamichi Ishibashi, Tokyo (JP); Masaaki Toju, Tokyo (JP)

(73) Assignee: Valeo Japan Co., Ltd. (JP)

( * ) Notice: Subject to any disclaimer, the term of this patent is extended or adjusted under 35 U.S.C. 154(b) by 0 days.

(21) Appl. No.: 15/356,166

(22) Filed: Nov. 18, 2016

(65) Prior Publication Data

US 2017/0150586 A1 May 25, 2017

(30) Foreign Application Priority Data

Nov. 19, 2015 (JP) ................................. 2015-226341

(51) Int. Cl.
  *H05B 37/02* (2006.01)
  *G02B 5/02* (2006.01)
  (Continued)

(52) U.S. Cl.
  CPC .......... *H05B 37/0281* (2013.01); *F21K 9/00* (2013.01); *F21S 4/20* (2016.01); *G02B 5/02* (2013.01);
  (Continued)

(58) Field of Classification Search
  CPC .. H05B 33/0803; H05B 37/0281; G02B 5/02; F21S 4/20
  See application file for complete search history.

(56) References Cited

U.S. PATENT DOCUMENTS

2005/0122742 A1* 6/2005 Ho ........................... F21K 9/00
                                                              362/615
2006/0002110 A1   1/2006 Dowling et al.
(Continued)

FOREIGN PATENT DOCUMENTS

DE   20319640 U1    3/2004
DE   102007002403 A1    8/2008
JP   5602616 B2    10/2014

OTHER PUBLICATIONS

European Search Report for EP application No. EP16197997.6 dated Mar. 9, 2017.
(Continued)

*Primary Examiner* — Douglas W Owens
*Assistant Examiner* — Pedro C Fernandez
(74) *Attorney, Agent, or Firm* — Fishman Stewart PLLC

(57) ABSTRACT

An illuminating device may include optical sources, a diffusion plate having emission regions corresponding to the optical sources, and a control unit configured to control lighting-up/lighting-out and an emission intensity of the optical sources based upon a schedule when carrying out performance on an optical travel by the diffusion plate. The emission regions each may have a predetermined length and extend in a longitudinal direction of the diffusion plate. In the schedule, a light-up/light-out state of each optical source and an emission intensity of an optical source to be lit up are set based upon an average illuminance in an illuminance distribution of the diffusion plate by combining illuminances of lights emitted from the emission regions. For realizing a temporal change of the average illuminance set, the light-up/light-out state of each optical source and emission intensity of the optical source to be lit up in each time point are set.

20 Claims, 22 Drawing Sheets

(51) Int. Cl.
  *F21S 4/20* (2016.01)
  *F21K 9/00* (2016.01)
  *H05B 33/08* (2006.01)
  *F21V 5/00* (2018.01)
  *F21V 7/00* (2006.01)
  *F21Y 103/10* (2016.01)

(52) U.S. Cl.
  CPC ....... *H05B 33/0845* (2013.01); *H05B 37/029* (2013.01); *H05B 37/0227* (2013.01); *F21V 5/008* (2013.01); *F21V 7/0083* (2013.01); *F21Y 2103/10* (2016.08)

(56) References Cited

U.S. PATENT DOCUMENTS

2006/0198128 A1   9/2006   Piepgras et al.
2015/0311689 A1   10/2015  Noh et al.

OTHER PUBLICATIONS

English Abstract for DE 102007002403 A1.
English abstract provided for JP-5602616.

\* cited by examiner

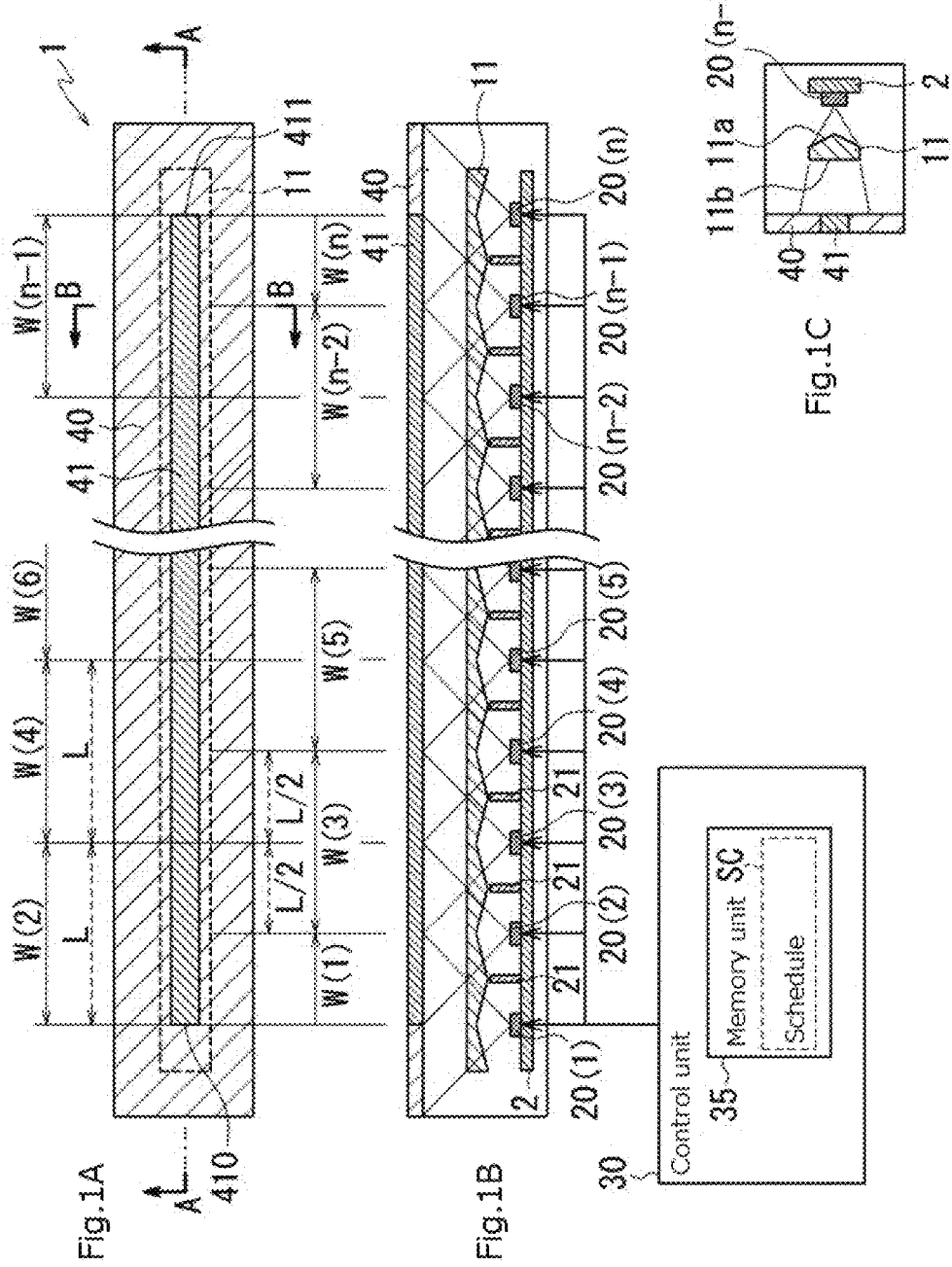

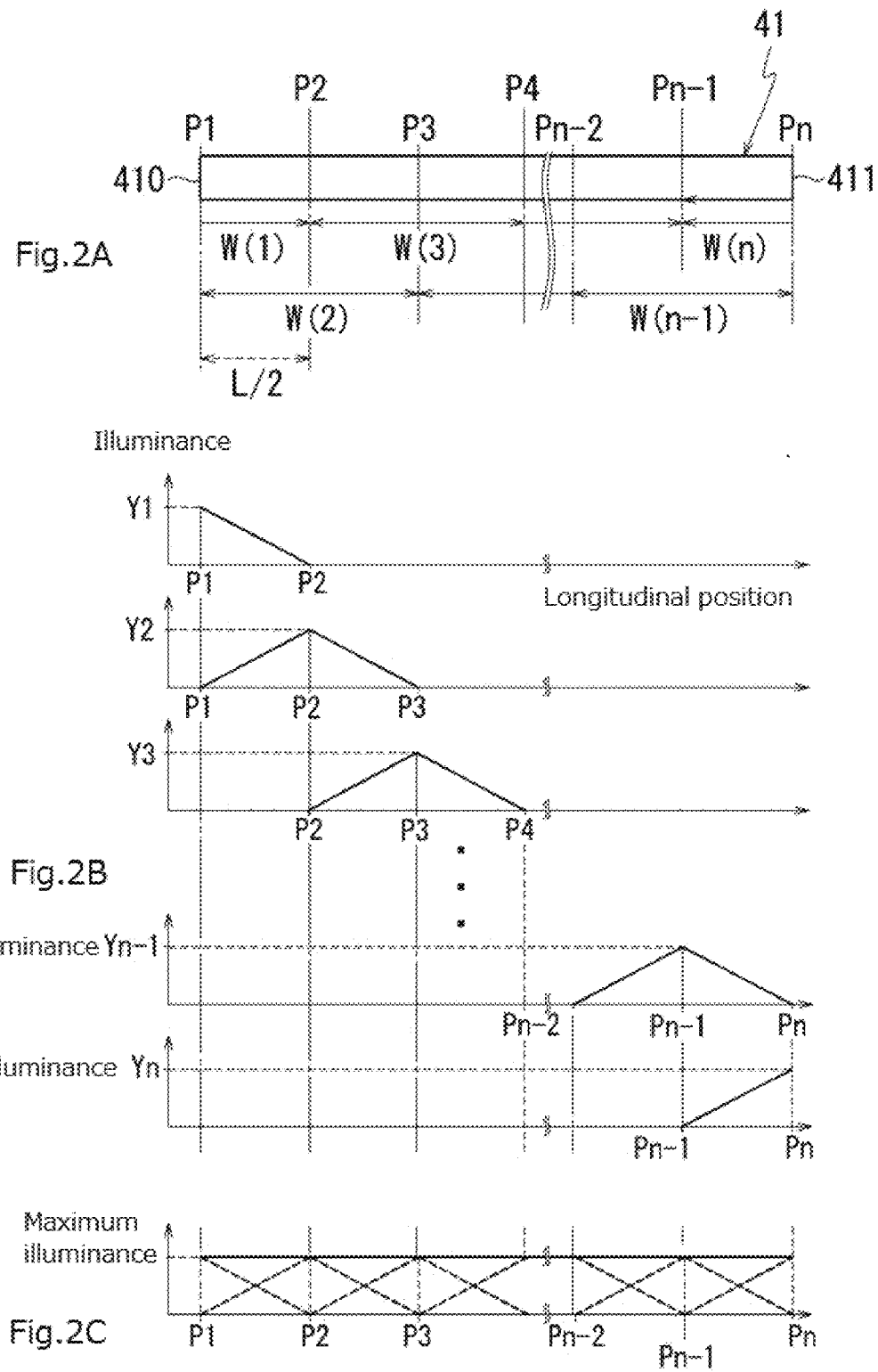

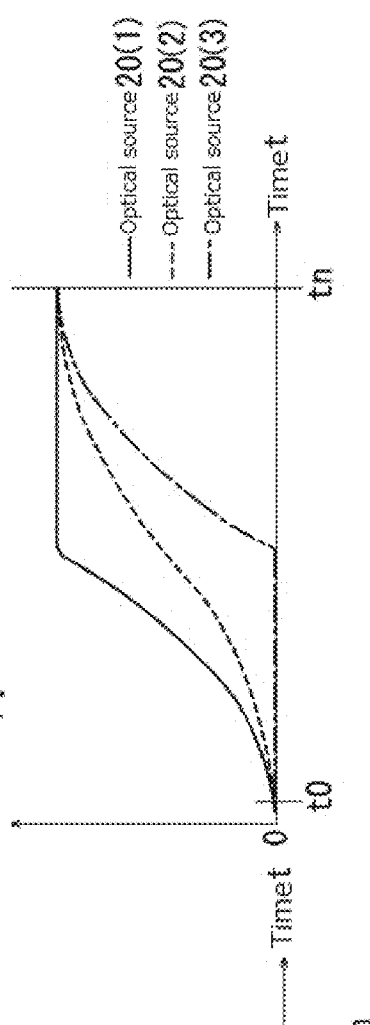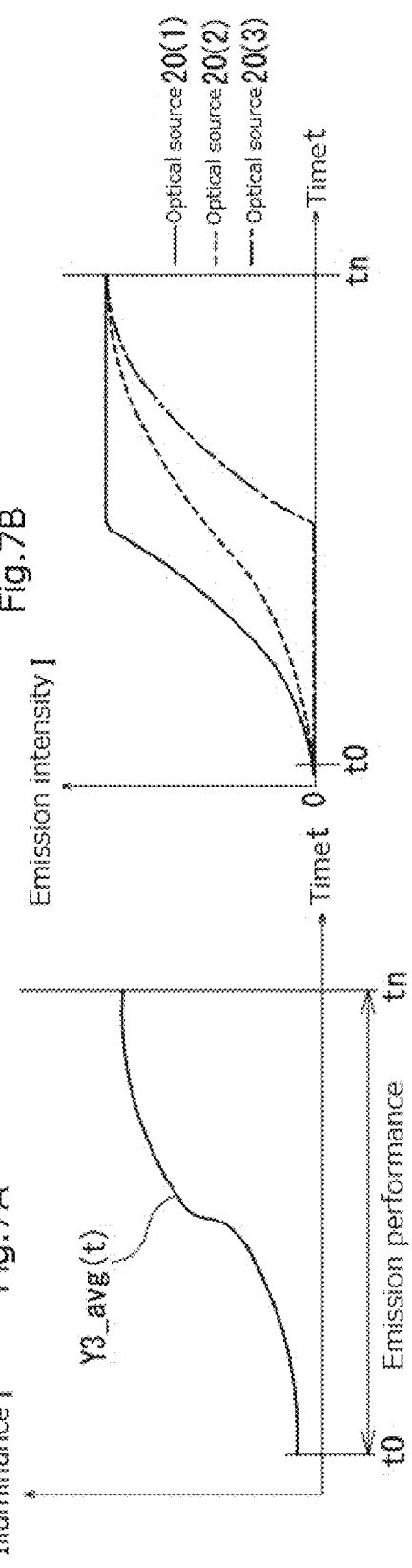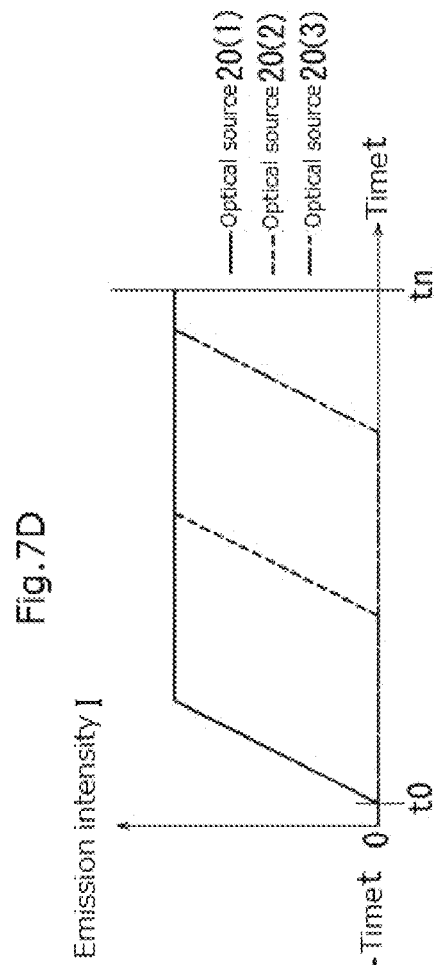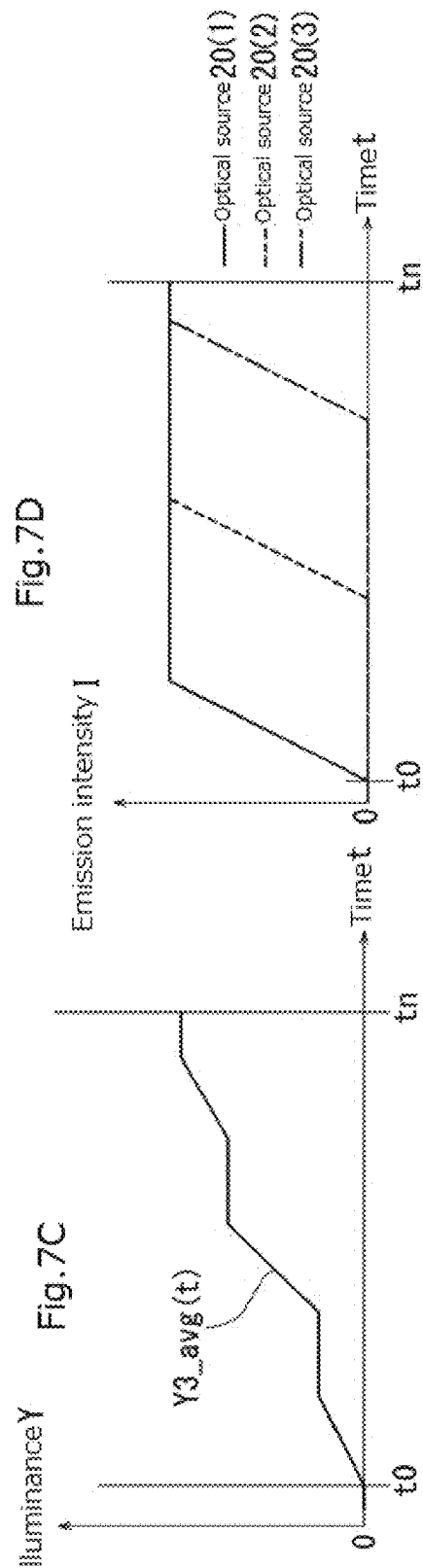

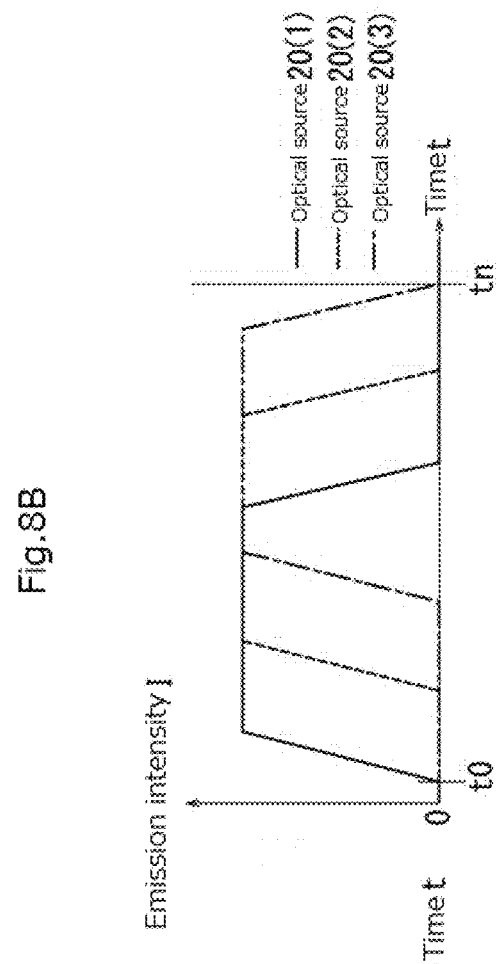
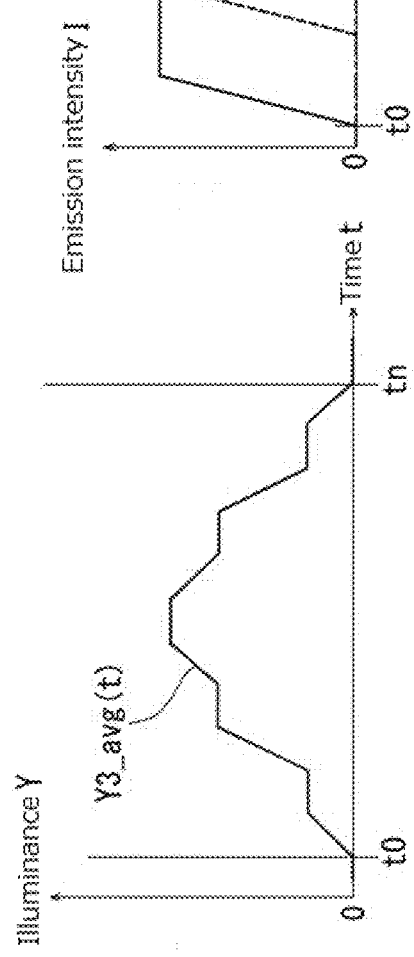

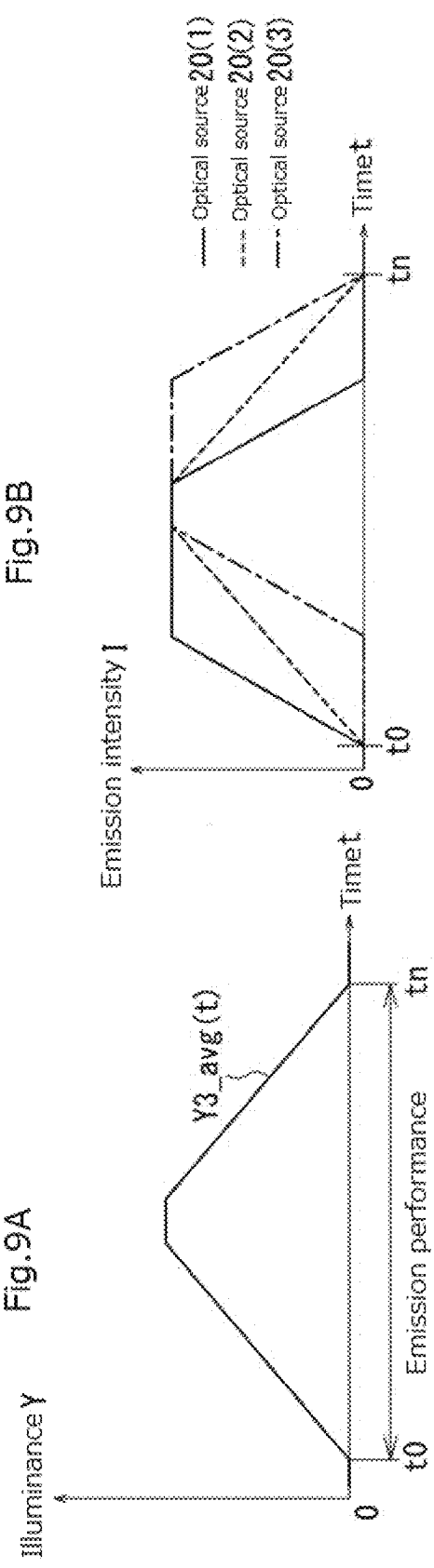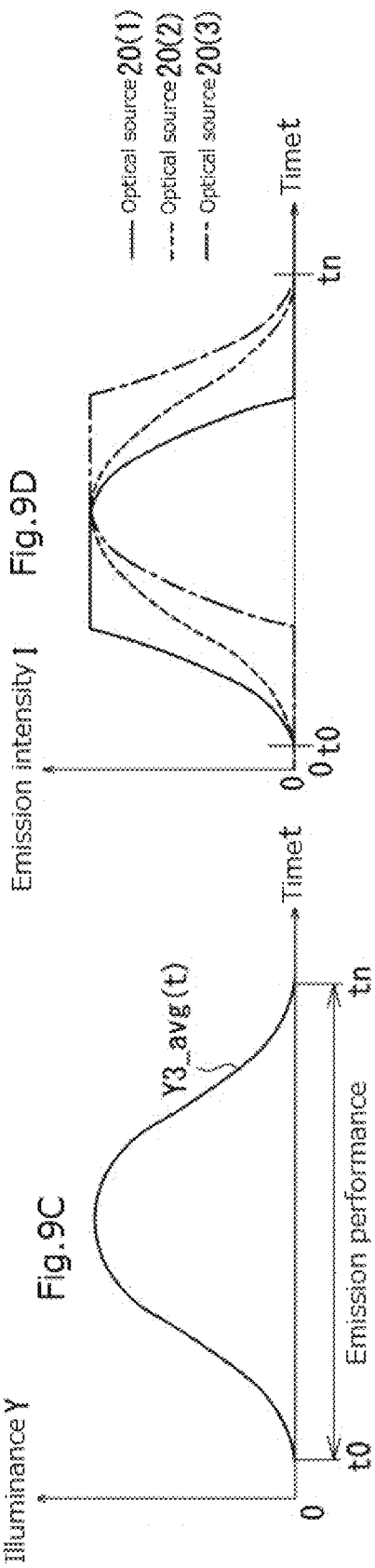

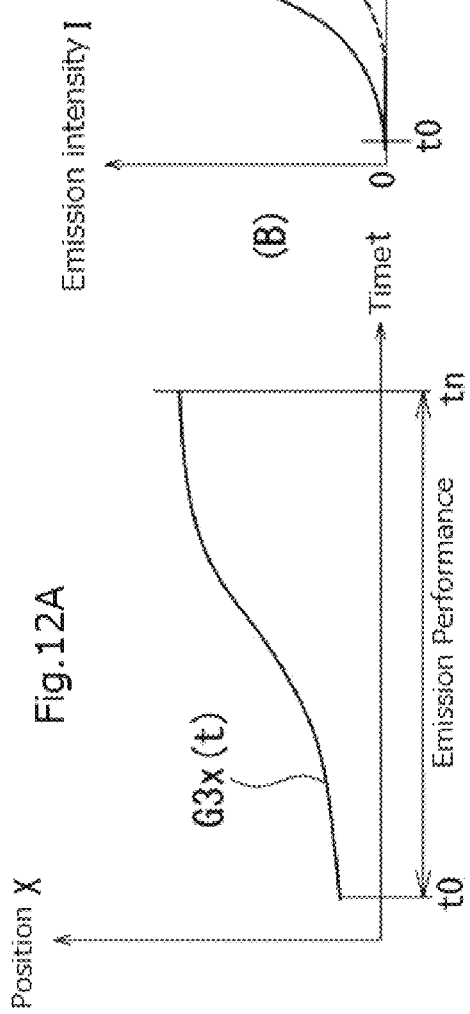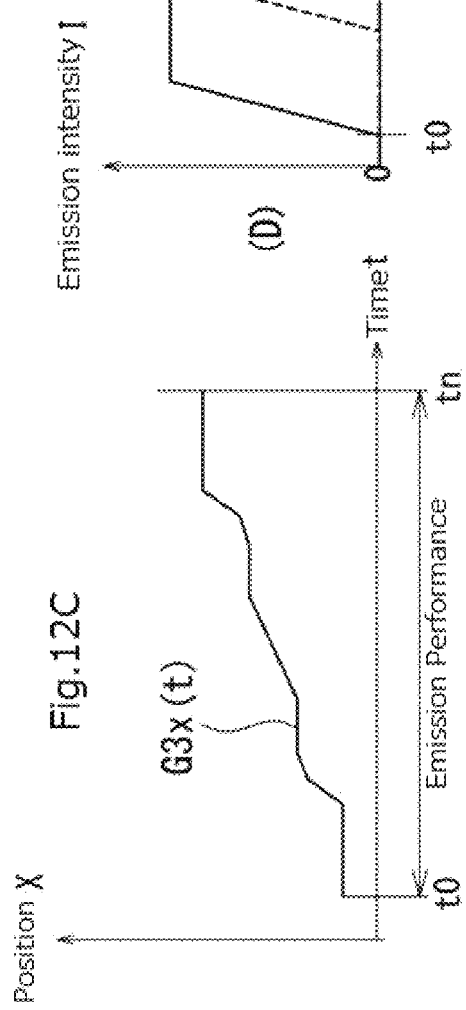

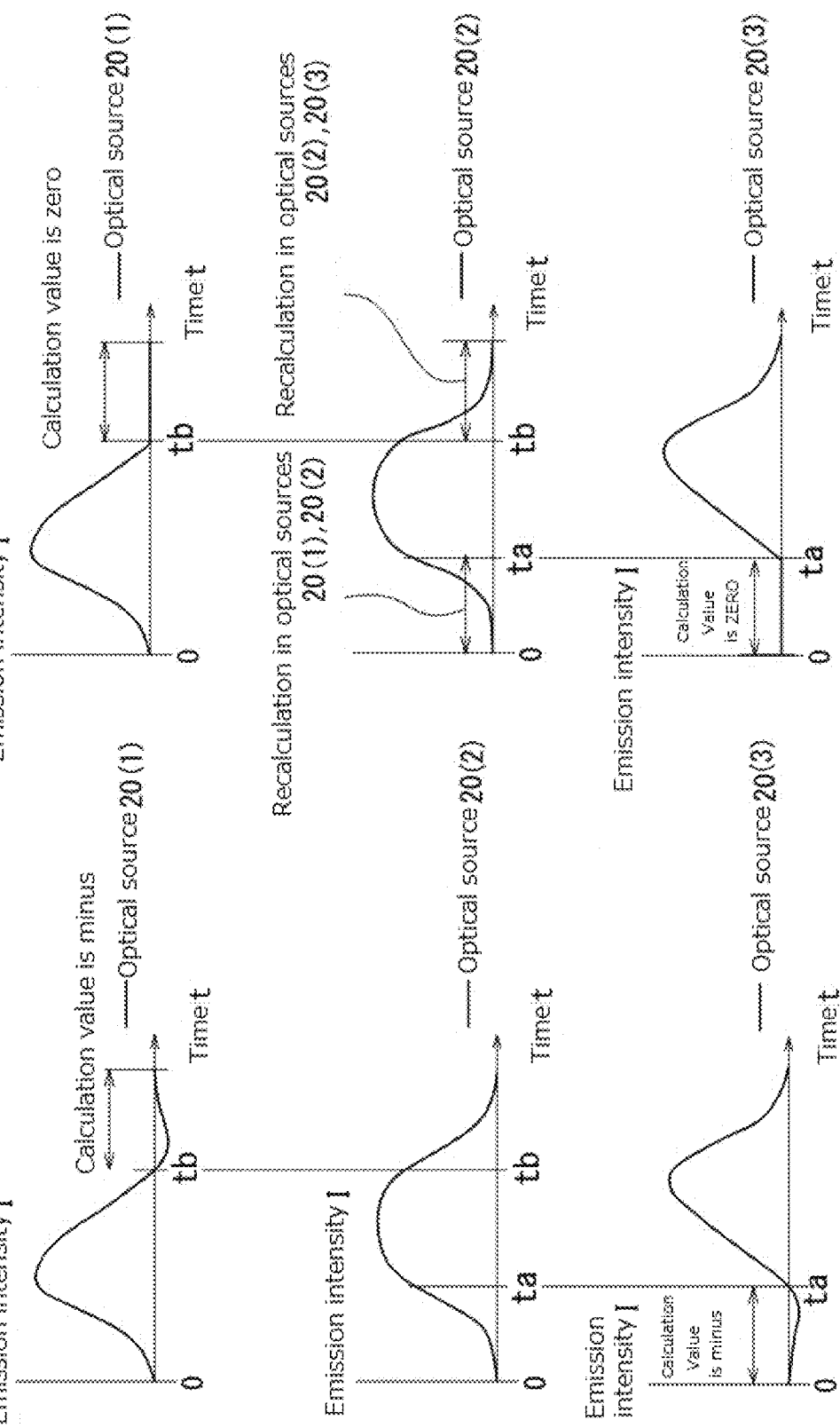

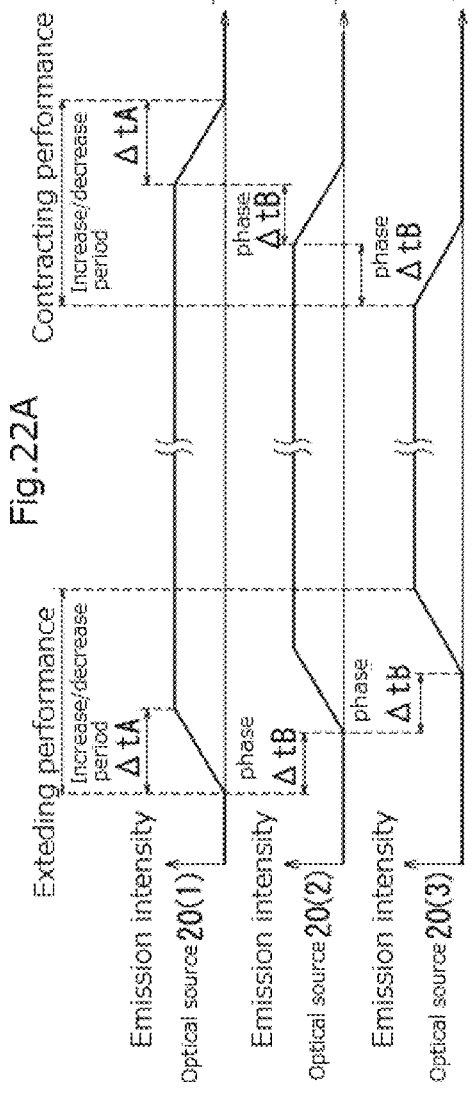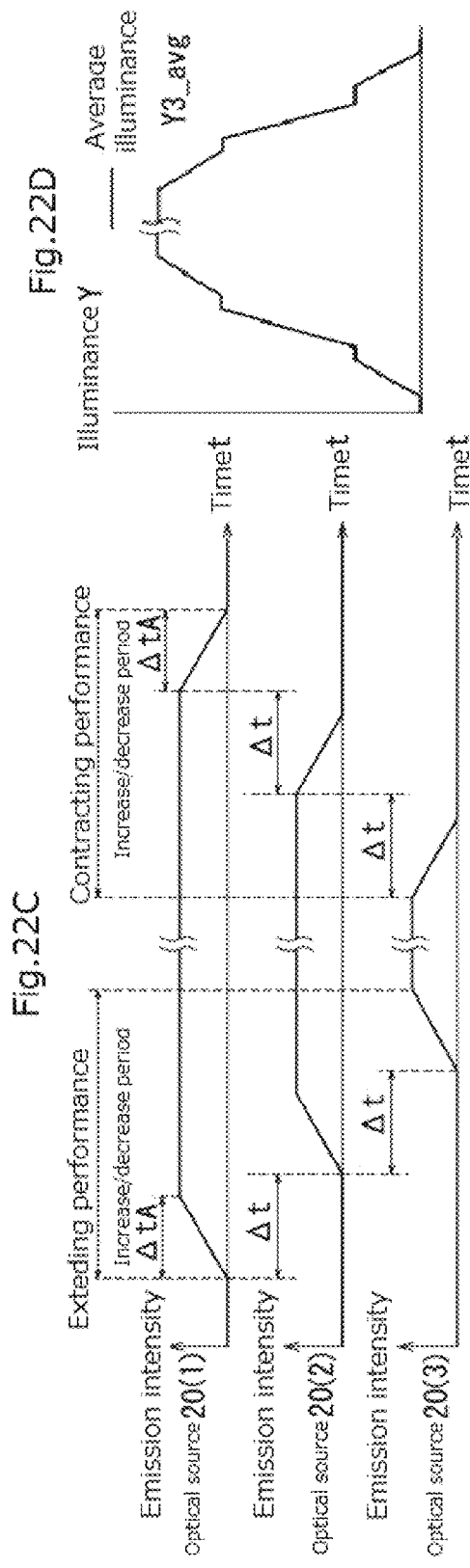

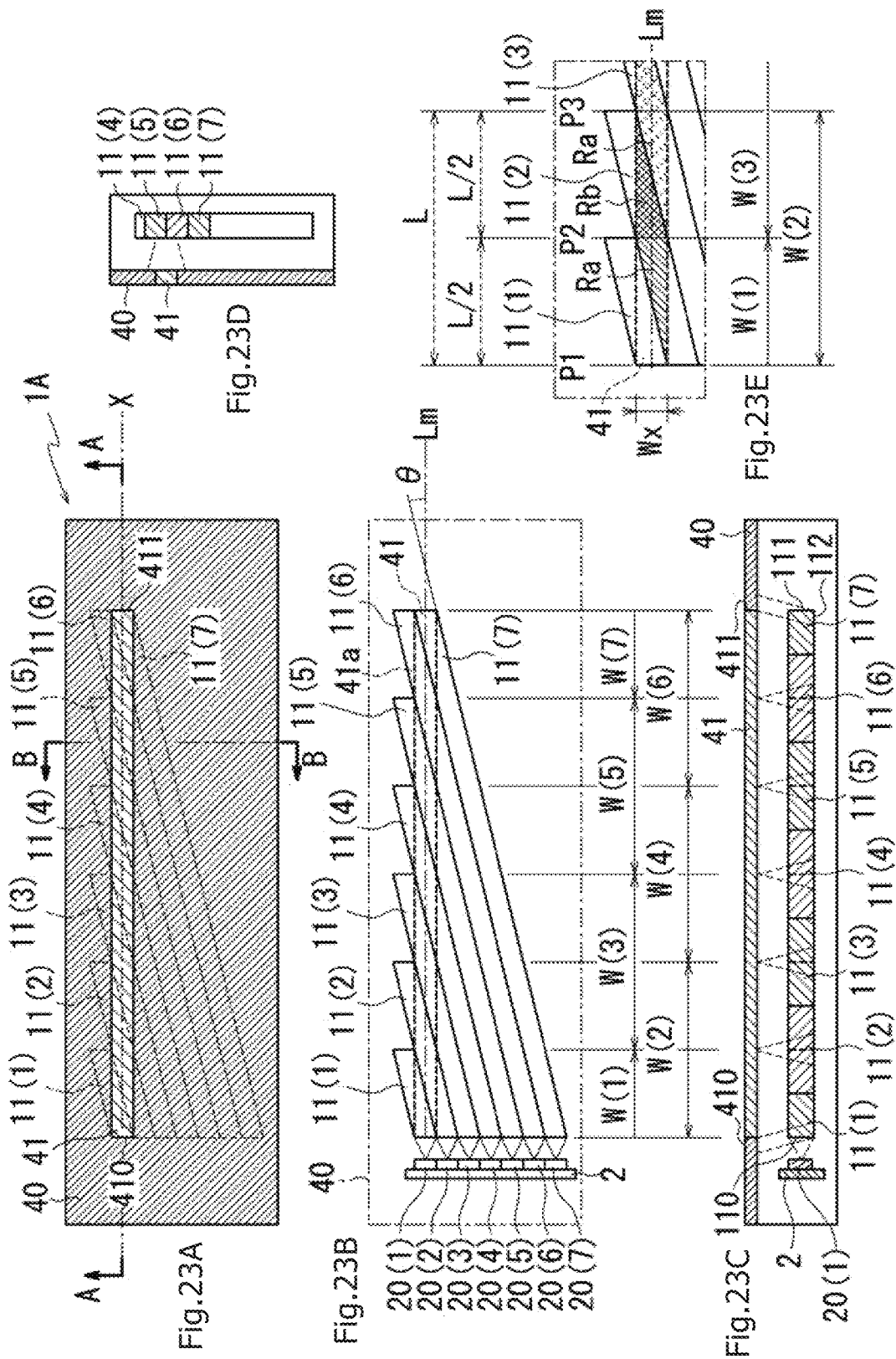

ILLUMINATING DEVICE

CROSS-REFERENCE TO RELATED APPLICATION

This application claims priority under 35 USC 119 from Japanese Patent Application No. 226341/2015 filed on Nov. 19, 2015, the disclosure of which is incorporated by reference herein in its entirety.

TECHNICAL FIELD

The present invention relates to an illuminating device.

BACKGROUND

Japanese Patent No. 5602616 discloses an illuminating device that sets a wavelength of one optical source out of optical sources arranged in both ends of an elongated light guiding element to include at least a part of a wavelength of the other optical source.

The illumination device 1 is configured such that illuminance of the one optical source and illuminance of the other optical source are successively changed independently with each other to gradually change from a color of the one optical source to a color of the other optical source, thus carrying out performance on an optical flow.

However, in a case of Japanese Patent No. 5602616, an illuminance distribution of each of the optical sources to the light guiding element is not definite. Therefore, it is indefinite how the light of each of the optical sources is mixed in color for optical performance, and it cannot be said that the performance effect of the light is excellent.

Accordingly, it is required to further enhance the performance effect of the light.

SUMMARY

The present invention is made in view of the aforementioned problem, and an object of the present invention is to provide an illuminating device comprising:

a plurality of optical sources;

a band-shaped diffusion plate having a plurality of emission regions corresponding on a one-to-one basis to the plurality of the optical sources respectively; and a control unit configured to control lighting-up/lighting-out and an emission intensity of each of the optical sources based upon a schedule at the time of carrying out performance on an optical travel in the diffusion plate, the plurality of emission regions each having a predetermined length in a longitudinal direction of the diffusion plate and being provided to successively extend in the longitudinal direction, wherein in the schedule, a lighting-up/lighting-out state of each of the plurality of optical sources and an emission intensity of an optical source to be lit up are set based upon an average illuminance in an illuminance distribution of the entire diffusion plate found by combining illuminances of lights emitted from the plurality of emission regions respectively, and for realizing a temporal change of the average illuminance preliminary set, the lighting-up/lighting-out state of each of the plurality of optical sources and the emission intensity of the optical source to be lit up in each time point in the middle of carrying out the performance are set.

According to the present invention, in the illuminating device, the lighting-up/lighting-out state of each of the plurality of optical sources and the emission intensity of the optical source to be lit up in each time point in the middle of carrying out the performance are controlled to realize the temporal change of the average illuminance in the illuminance distribution in the entire diffusion plate.

Thereby, for carrying out the performance on the optical travel by the diffusion plate, the schedule is made to set the lighting-up/lighting-out state of each of the optical sources and the emission intensity of the optical source to be lit up to add one reference of the average illuminance in the illuminance distribution in the entire diffusion plate at the time of setting the light-up/light-out state of each of the optical sources and the emission intensity of the optical source to be lit up, and to give the temporal order to the added reference. Thereby, since it is possible to visualize the light to smoothly travel at the time of carrying out the performance on the optical travel by the diffusion plate, it is possible to further enhance the performance effect of the light.

BRIEF DESCRIPTION OF THE DRAWINGS

Other objects, features, and advantages of the present invention will become more apparent from the following detailed description made with reference to the accompanying drawings, in which like parts are designated by like reference numbers and in which:

FIGS. 1A to 1C are diagrams explaining an illuminating device according to a first embodiment of the present invention;

FIGS. 2A to 2C are diagrams explaining emission regions in a diffusion plate according to the first embodiment;

FIGS. 7A to 7D are diagrams explaining a relation between a change in the average illuminance of the diffusion plate and an emission intensity of an optical source according to the first embodiment;

FIGS. 8A and 8B are diagrams explaining a relation between a change in the average illuminance of the diffusion plate and an emission intensity of an optical source according to the first embodiment;

FIGS. 9A to 9D are diagrams explaining a relation between a change in the average illuminance of the diffusion plate and an emission intensity of an optical source according to the first embodiment;

FIGS. 12A to 12D are diagrams explaining a temporal change in a gravity center in an illuminance distribution shape (x, y) when a position of the diffusion plate in a longitudinal direction is indicated at "x" and illuminance is indicated at "y" (hereinafter, gravity center in the illuminance distribution of the diffusion plate) and a change in an emission intensity of each of optical sources in this case according to the second embodiment;

FIGS. 15A and 15B are diagrams explaining a relation between a change in the gravity center in the illuminance distribution of the diffusion plate and the emission intensity of the optical source according to the second embodiment;

FIGS. 22A to 22D are time charts of lighting-up/lighting-out of each of optical sources at the time of performing extending performance of light and contracting performance of light according to the second embodiment; and FIGS. 23A to 23E are diagrams explaining an illuminating device according to the other embodiment of the present invention.

DETAILED DESCRIPTION

First Embodiment

Figure 3A:
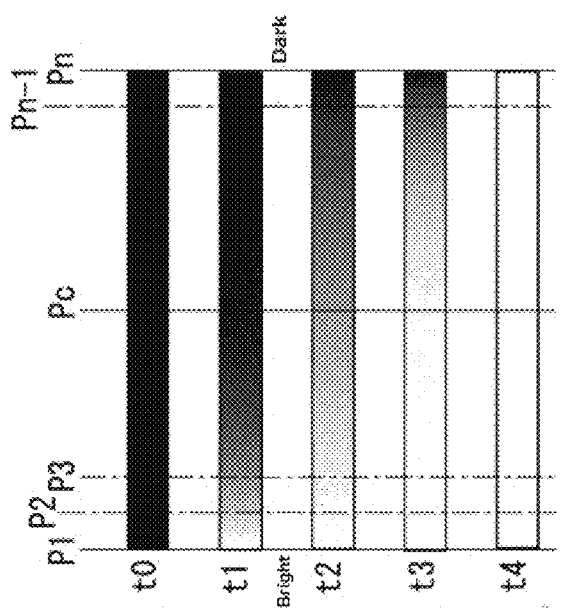
FIGS. 3A to 3C are diagrams explaining an illumination performance in the diffusion plate according to the first embodiment.

Hereinafter, an explanation will be made of an illuminating device 1 according to a first embodiment of the present invention.

FIGS. 1A to 1C are diagrams explaining the illuminating device 1 according to the first embodiment, wherein FIG. 1A is a plan view illustrating the illuminating device 1 as viewed from a light emitting surface side, FIG. 1B is a cross section taken in the direction of arrows A-A in FIG. 1A and FIG. 1C is an enlarged cross section taken in the direction of arrows B-B in FIG. 1A.

In the following explanation, in a case where it is required to distinguish between a plurality of optical sources 20, an explanation will be made by attaching a parenthesis with an ordinal number for distinguishing after a sign, such as optical source 20(1), . . . 20(n). Emission regions "W" will be described in the same way.

[Illuminating Device 1]

As illustrated in FIGS. 1A to 1C, the illuminating device 1 includes a plurality of optical sources 20(1) to 20(n), a band-shaped diffusion plate 41 having a plurality of emission regions W(1) to w(n) corresponding on a one-to-one basis to the plurality of optical sources 20(1) to 20(n), and a control unit 30 configured to control lighting-up/lighting-out and an emission intensity of each of the optical sources 20(1) to 20(n).

The diffusion plate 41 is provided in a central part of a light blocking plate 40 formed in a rectangular shape in planar view, and the plurality of optical sources 20(1) to 20(n) provided on a substrate 2 line up by predetermined intervals along a longitudinal direction of the diffusion plate 41 (left-right direction in FIG. 1B) under the diffusion plate 41.

Light blocking plates 21 each are provided between the optical sources 20 adjacent in a longitudinal direction of the diffusion plate 41 on the substrate 2, and a light guiding member 11 upon which light emitted from each of the optical sources 20 is incident is provided above the light blocking plate 21.

In planar view, the light guiding member 11 is formed in the same band shape with the diffusion plate 41.

A bottom surface 11a of the light guiding member 11 in the substrate 2-side is configured as an incident surface of light emitted from each of the optical sources 20, and cross-section shapes of the light guide member 11 differ in a longitudinal direction and in a width direction of the light guiding member 11.

Specifically the cross-section shape of the light guiding member 11 in the longitudinal direction is formed in a concave lends (refer to FIG. 1B) defining a traveling direction of the light incident upon the light guiding member 11 in the longitudinal direction, and the cross-section shape of the light guiding member 11 in the width direction is formed in a convex lends (refer to FIG. 1C) defining a traveling direction of the light incident upon the light guiding member 11 in the width direction.

In the present embodiment, when the light of each of the optical sources 20(1) to 20(n) incident upon the bottom surface 11a of the light guiding member 11 is emitted from an upper surface 11b of the light guiding member 11, the upper surface 11b is set to emit the light toward an emission region corresponding to each of the optical sources 20(1) to 20(n) out of the emission regions W(1) to W(n) set on the diffusion plate 41.

The diffusion plate 41 has a function of diffusing and transmitting the light incident from the light guiding member 11-side.

In the diffusion plate 41, the emission regions W(1) to W(n) corresponding to the optical sources 20(1) to 20(n) on a one-to-one basis are set to successively extend in the longitudinal direction of the band-shaped diffusion plate 41, and each of the emission regions W(1) to W(n) is a region having a predetermined area formed in a rectangular shape in planar view.

The emission regions W(1) to W(n) each have the same length L in the longitudinal direction of the diffusion plate 41 other than the emission region W(1) positioned in one end 410 of the diffusion plate 41 in the longitudinal direction and the emission region W(n) in the other end 411, and the emission regions W(1) and W(n) each have half (L/2) a length of each of the other emission regions W(2) to W(n−1).

The emission regions W(2) to W(n−1) each positioned between the emission regions W(1) and W(n) are provided to overlap the other emission region adjacent in the longitudinal direction of the diffusion plate 41 in a predetermined range of both side parts of each other in the longitudinal direction.

In the present embodiment, the predetermined range is set to be half L/2 a length of an entire length L of each of the emission regions W(2) to W(n−1).

Therefore, one side of each of the emission regions W(2) to W(n−1) in the longitudinal direction overlaps the other emission region adjacent on the one side in a length range of L/2, and the other side overlaps the other emission region adjacent on the other side in a length range of L/2.

Here, by referring to FIGS. 2A to 2C, an explanation will be made of positions of the emission regions W(1) to W(n) corresponding to the respective optical sources in the diffusion plate 41, illuminance distributions of lights emitted from the respective emission regions W(1) to W(n) and an entire illuminance distribution of all the optical sources in the diffusion plate 41.

FIGS. 2A to 2C are diagrams explaining the emission regions W(1) to W(n) in the diffusion plate 41, wherein FIG. 2A is a diagram explaining a range in which the emission regions W(1) to W(n) in the diffusion plate 41 are provided, FIG. 2B is a diagram explaining an illuminance distribution in each of the emission regions W(1) to W(n) in the diffusion plate 41, and FIG. 2C is a diagram explaining an illuminance distribution in the entire diffusion plate 41 at the time of lighting up all the optical sources 20(1) to 20(n) at the maximum emission intensity.

The emission region W(1) is set on one end 410 of the diffusion plate 41 in the longitudinal direction, and the emission region W(n) is set on the other end 411 of the diffusion plate 41 in the longitudinal direction.

The emission regions W(2) to W(n−1) corresponding to the respective optical sources 20(2) to 20(n−1) in the diffusion plate 41 are each arranged to offset by a predetermined length L/2 from the one end 410-side to the other end 411-side in the longitudinal direction.

Therefore, in the diffusion plate 41, each of center positions P2 to Pn−1 in each of the emission regions W(2) to W(n−1) offsets in the longitudinal direction of the diffusion plate 41 by a predetermined length L/2.

As described above, in the diffusion plate 41 each of the emission region W(1) positioned in the one end 410 of the diffusion plate 41 and the emission region W(n) in the other end 411 of the diffusion plate 41 has a length in the longitudinal direction of the diffusion plate 41, the length being half (L/2) a length of each of the other emission regions W(2) to W(n−1).

In the emission region W(1) and the emission region W(n) of the diffusion plate 41 each, illuminance Y of light to be emitted is the lower as the farther from the one end 410 or the other end 411 (refer to FIGS. 2A and 2B).

In the emission regions W(2) to W(n−1) each positioned between the emission regions W(1) and W(n) of the diffusion plate 41, the illuminance is maximized in each of the center position P2 to the center position Pn−1 in the longitudinal direction, and is the lower as the farther from each of the center position P2 to the center position Pn−1.

Therefore, in a case of lighting up the optical source 20(1) alone in the maximum emission intensity, the illuminance distribution of the emission region W(1) in the diffusion plate 41 in the longitudinal direction (left-right direction in FIG. 2A) decreases from the position P1 having the maximum value toward the position P2, and thereafter, becomes the minimum value in the position P2.

In addition, in a case of lighting up the optical source 20(2) alone in the maximum emission intensity, the illuminance distribution of the emission region W(2) in the diffusion plate 41 in the longitudinal direction (left-right direction in FIG. 2A) increases from the position P1 having the minimum value toward the position P2, is maximized in the position P2, thereafter decreases toward the position P3, and is minimized in the position P3.

Therefore, in a case of lighting up the optical source 20(n) alone in the maximum emission intensity, the illuminance distribution of the associated emission region W(n) in the diffusion plate 41 in the longitudinal direction (left-right direction in FIG. 2B) increases from the position Pn−1 having the minimum value toward the position Pn, and thereafter, becomes the maximum value in the position Pn.

In a case of lighting up each of the optical source 20(3) to the optical source 20(n−1) in the maximum emission intensity, the longitudinal illuminance change is the same as in a case of lighting up the aforementioned optical source 20(2) alone.

The lighting-up/lighting-out state of each of the optical sources 20(1) to 20(n) and the emission intensity of the optical source 20 to be lit up are controlled by the aforementioned control unit 30 (refer to FIG. 1B). When the control unit 30 controls the lighting-up/lighting-out state of each of the optical sources 20(1) to 20(n) and the emission intensity of the optical source 20 to be lit up, an entire illuminance distribution by all the optical sources in the diffusion plate 41 can be controlled to any illuminance distribution.

Incidentally in a case of lighting up all of the optical sources 20(1) to 20(n) in the same emission intensity (for example, in the maximum emission intensity), the entire illuminance distribution by all the optical sources in the diffusion plate 41 becomes uniform from the position P1 to the position Pn (refer to FIG. 2C).

Therefore, in the illuminating device 1 according to the present embodiment, by controlling the lighting-up/lighting-out state of each of the optical sources 20(1) to 20(n) and the emission intensity of the optical source 20 to be lit up, any position (region) in the diffusion plate 41 can be made brighter or darker than the other position (region), and further, the bright position or dark position is displaced in the longitudinal direction of the diffusion plate 41, thus making it possible to carry out the performance by the light.

[Illumination Performance]

Figure 3B:
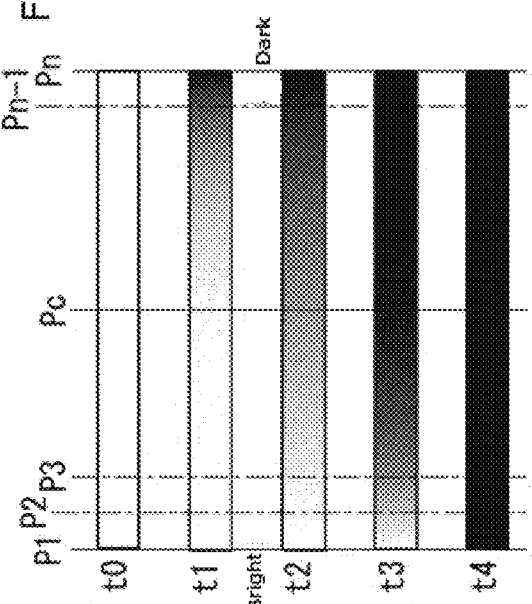
Figure 3C:
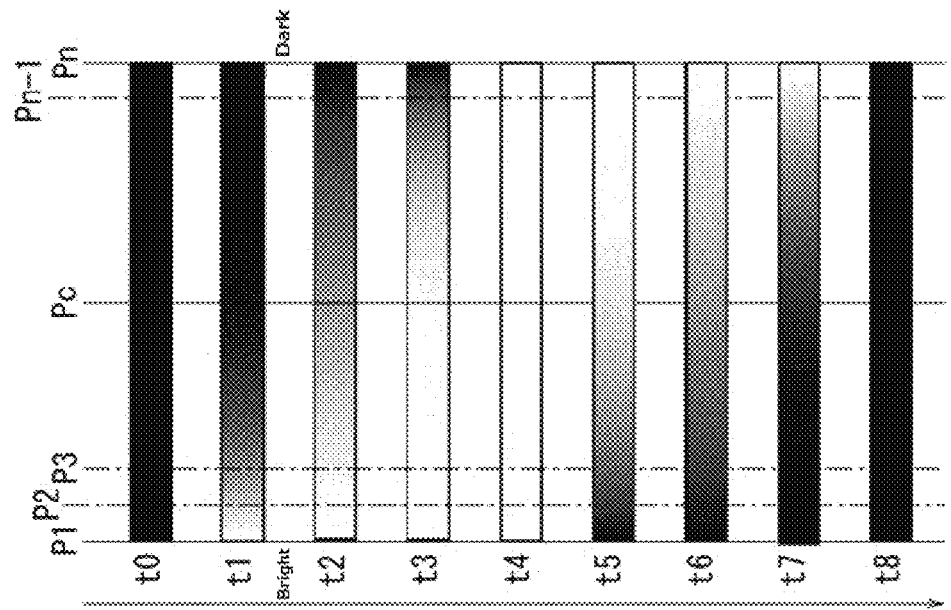

FIGS. 3A to 3C are diagrams explaining illumination performance in the diffusion plate 41, wherein FIG. 3A is a diagram explaining displacements in bright regions and dark regions in the diffusion plate 41 in a case of performing illumination performance on light extending, FIG. 3B is a diagram explaining displacements in bright regions and dark regions in the diffusion plate 41 in a case of performing illumination performance on light contracting, and FIG. 3C is a diagram explaining displacements in bright regions and dark regions in the diffusion plate 41 in a case of performing illumination performance on an optical flow.

In FIGS. 3A to 3C, the changes in bright regions and dark regions in the diffusion plate 41 line up in order of timeline, and the upper side in the drawing illustrates a state of the diffusion plate 41 in a start time t0 of performance, and toward the downside in the drawing, a state of the diffusion plate 41 is illustrated in a time point where a predetermined time (each of t1 to t4, t1 to t8) elapses from the start of the performance.

[Illumination Performance on Light Extending]

As illustrated in FIG. 3A, in a case of the illumination performance on the light extending, all the optical sources 20(1) to 20(n) are lit out in start time t0 of the performance, and the diffusion plate 41 is dark over an entire surface.

In time t1 immediately after the start of the performance, the lighting-up/lighting-out state of each of the optical sources 20(1) to 20(n) and the emission intensity of the optical source 20 to be lit up are controlled such that the one end 410-side of the diffusion plate 41 in the longitudinal direction (left side in the drawing) is the brightest, and toward the other end 411-side (right side in the drawing), the diffusion plate 41 becomes gradually darker.

In this state, the optical source 20(1) corresponding to the emission region of the position P1 emits light in the highest emission intensity.

The other optical sources 20(2), 20(3), . . . adjacent to the optical source 20(1) are controlled to emit light in the emission intensity gradually lower than the optical source 20(1), and, for example, optical sources closer to the right side in the drawing than the optical source 20(c) corresponding to the emission region in the center position Pc in the longitudinal direction are controlled to be in a lighting-out state.

In subsequent time t2 and time t3, the number of the optical sources 20 to be lit up is increased in such a manner that the bright region reaches emission regions closer to the other end 411-side than the emission region in the center position Pc in the longitudinal direction, and the emission intensity of the optical source 20 closer to the optical source side in the lighting-out state out of the lit optical sources 20 is controlled to be gradually low.

Finally, in time t4, all the optical sources 20(1) to 20(n) are lit up to make all the regions from the one side 410-side to the other end 411-side in the diffusion plate 41 be in the bright state.

[Illumination Performance on Light Contracting]

As illustrated in FIG. 3B, in a case of the illumination performance on the light contracting, all the optical sources 20(1) to 20(n) are lit up in start time t0 of the performance, making the diffusion plate 41 bright over an entire surface.

In time t1 immediately after the start of the performance, the lighting-up/lighting-out state of each of the optical sources 20(1) to 20(n) and the emission intensity of the optical source 20 to be lit up are controlled such that the other end 411-side of the diffusion plate 41 in the longitudinal direction (right side in the drawing) is the darkest, and toward the one end 410-side (left side in the drawing), the diffusion plate 41 becomes gradually brighter.

In this state, the optical source 20(n) corresponding to the emission region of the position Pn is lit out.

The other optical sources 20(n−1), 20(n−2), . . . adjacent to the optical source 20(n) are controlled to emit light in the emission intensity gradually higher than the optical source 20(n), and, for example, all of optical sources closer to the left side in the drawing than the optical source 20(c) corresponding to the emission region in the center position Pc in the longitudinal direction are controlled to be in a lighting-out state.

In subsequent time t2 and time t3, the number of the optical sources 20 to be lit up is decreased in such a manner that the dark region reaches emission regions closer to the one end 410-side than the emission region in the center position Pc in the longitudinal direction, and the emission intensity of the optical source 20 closer to the other end 411-side out of the lit optical sources 20 is controlled to be gradually low.

Finally, in time t4, all the optical sources 20(1) to 20(n) are lit out to make all the regions from the one side 410-side to the other end 411-side in the diffusion plate 41 be in the dark state.

[Illumination Performance on Optical Flow]

As illustrated in FIG. 3C, in a case of the illumination performance on the optical flow, all the optical sources 20(1) to 20(n) are lit out in start time t0 of the performance, making the diffusion plate 41 dark over an entire surface.

In time t1 immediately after the start of the performance, the lighting-up/lighting-out state of each of the optical sources 20(1) to 20(n) and the emission intensity of the optical source 20 to be lit up are controlled such that the one end 410-side of the diffusion plate 41 in the longitudinal direction (left side in the drawing) 41 is the brightest, and toward the other end 411-side (right side in the drawing), the diffusion plate 41 becomes gradually darker.

In this state, the optical source 20(1) corresponding to the emission region of the position P1 emits light in the highest emission intensity.

The other optical sources 20(2), 20(3), . . . adjacent to the optical source 20(1) are controlled to emit light in the emission intensity gradually lower than the optical source 20(1), and, for example, all the optical sources 20 closer to the right side in the drawing than the optical source 20(c) corresponding to the emission region in the center position Pc in the longitudinal direction are controlled to be held in a lighting-out state.

In subsequent time t2 and time t3, the number of the optical sources 20 to be lit up is increased in such a manner that the bright region reaches emission regions closer to the other end 411-side than the emission region in the center position Pc in the longitudinal direction, and the emission intensity of each of the lit optical sources 20 is controlled to be lower toward the other end 411 to be gradually dark.

Finally, in time t4, all the optical sources 20(1) to 20(n) are lit up to make all the regions from the one side 410-side to the other end 411-side in the diffusion plate 41 be in the bright state.

In subsequent time t5, the optical source 20(1) corresponding to the emission region of the one end 410-side (left side in the drawing) in the diffusion plate 41 in the longitudinal direction is lit out, and the other optical sources 20(2), 20(3), . . . adjacent to the optical source 20(1) are controlled to emit light in the emission intensity gradually higher than the optical source 20(1).

In subsequent time t6 and time t7, for causing the dark region to reach emission regions closer to the other end 411-side than the emission region in the center position Pc in the longitudinal direction, the number of the optical sources 20 to be lit out is increased and the optical sources 20 closer to the one end 410-side out of the optical sources 20 held in the lighting-up state are controlled to be darker than the optical sources 20 positioned closer to the other end 411-side.

Finally, in time t8, all the optical sources 20(1) to 20(n) are lit out to make all the regions from the one side 410-side to the other end 411-side in the diffusion plate 41 be in the dark state.

[Schedule SC]

In the present embodiment, for carrying out this illumination performance, the control unit 30 controls the lighting-up/lighting-out state of each of the optical sources 20(1) to 20(n) and the emission intensity of the optical source 20 to be lit up, based upon a schedule SC stored in a memory unit 35.

An explanation will be made of an entire illuminance distribution of the diffusion plate 41 by taking a case where the number of optical sources is three (optical sources 20(1), 20(2) and 20(3)) as the content of the schedule SC, as an example.

Figure 4A:
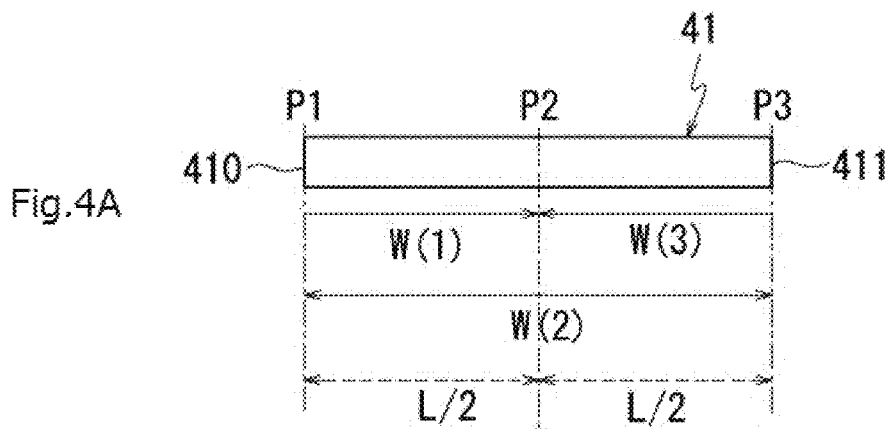
FIGS. 4A to 4C are diagrams explaining illuminance distributions on the diffusion plate in a case of three optical sources according to the first embodiment.
Figure 4B:
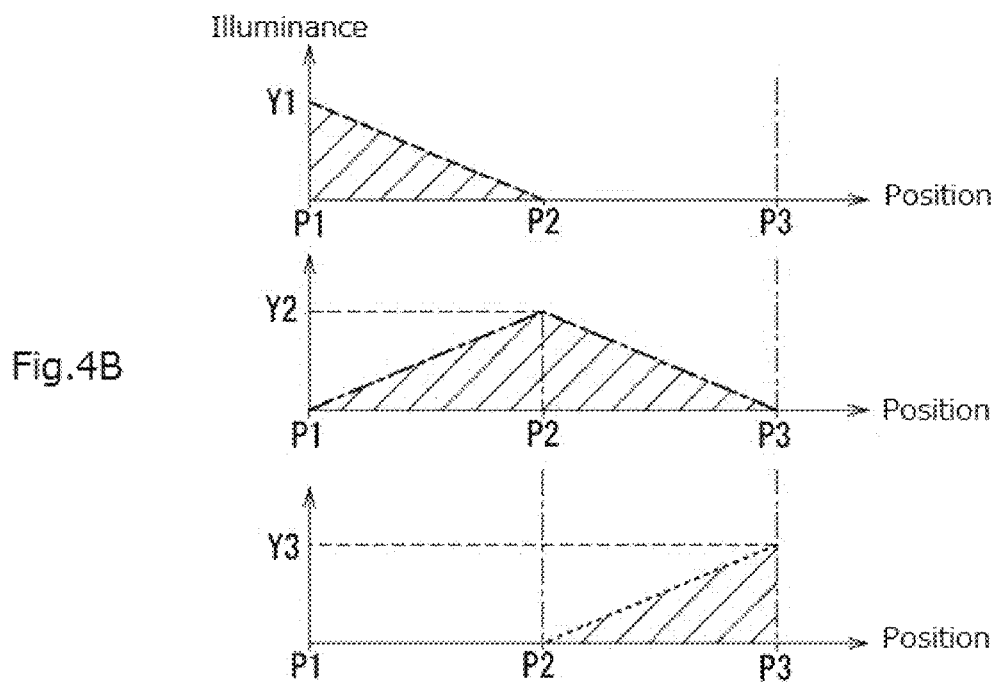
Figure 4C:
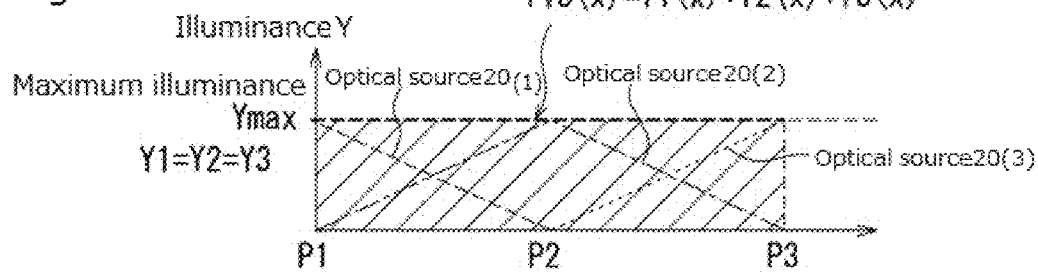

FIGS. 4A to 4C are diagrams explaining positions of emission regions W(1) to W(3) and illuminance distributions in the diffusion plate 41 in a case where the number of the optical sources is three, wherein FIG. 4A is a diagram explaining positions of the emission regions W(1) to W(3) of the respective optical sources 20(1) to 20(3) in the diffusion plate 41, FIG. 4B is a diagram explaining an illuminance distribution of each of the emission regions W(1) to W(3) in the diffusion plate 41 upon lighting up each of the optical sources 20(1) to 20(3) in the maximum illuminance, and FIG. 4C is a diagram explaining an illuminance distribution of the entire diffusion plate 41 at the time of lighting up each of the optical sources 20(1) to 20(3) in the maximum illuminance.

[Illuminance Distributions in the Diffusion Plate 41 in a Case where the Number of the Optical Sources is Three]

The emission region W(1) is set in one end 410 of the diffusion plate 41 in the longitudinal direction, the emission region W(3) is set in the other end 411, and the emission region W(2) is set between the emission region W(1) and the emission region W(3).

A distribution (illuminance distribution) of illuminance Y of emission light in the emission region W(1) in the diffusion plate 41 is made the smaller as the farther from the one end 410 having the maximum illuminance Y1, and a distribution (illuminance distribution) of illuminance Y of emission light in the emission region W(3) in the diffusion plate 41 is made the smaller as the farther from the other end 410 having the maximum illuminance Y3 (refer to FIG. 4B). Finally, the illuminance becomes zero in a position P2 in the intermediate point between a position P1 and a position P3 in the emission regions W(1) and W(3).

In addition, in the emission region W(2) in the diffusion plate 41, a distribution (illuminance distribution) of illuminance Y of emission light is the maximum illuminance Y2 in a center position P2 in the emission region W(2) in the longitudinal direction, and the illuminance is made the smaller as the farther from the center position P2. Finally, the illuminance becomes zero in the position P1 and the position P3.

Therefore, in a case of lighting up each of the optical sources 20(1) to 20(3) in the maximum illuminance, an illuminance distribution of the diffusion plate 41 in the longitudinal direction becomes an illuminance distribution (f13(x)) found by combining the illuminance distributions in the emission regions W(1) to W(3) of the diffusion plate 41 in FIG. 4B.

In FIG. 4C illustrating the combined illuminance distribution, the illuminance distribution Y is the maximum illuminance Ymax from the position P1 to the position P3. Therefore, an illuminance distribution of the diffusion plate 41 in the longitudinal direction in this case becomes a uniform illuminance distribution over an entire length from the one end 410 to the other end 411.

Here, an average illuminance (brightness) Y3_avg of the diffusion pate 41 can be represented according to the following formula (1) when a length L1 of the diffusion plate 41 is indicated at [1], an illuminance peak (maximum illuminance) by the optical source 20(1) is indicated at Y1, an illuminance peak by the optical source 20(2) is indicated at Y2 and an illuminance peak by the optical source 20(3) is indicated at Y3.

[Formula 1]

$$Y3\_avg = \frac{(Y1 + 2 \times Y2 + Y3)}{4} \quad (1)$$

Here, the reason why Y2 is multiplied by two is that an area of a hatched part of each of the illuminance distributions in FIG. 4B is proportional to each entire optical amount and an entire optical amount by the optical source 20(2) is twice the entire optical amount by each of the optical source 20(1) and the optical source 20(3).

Figure 5A:
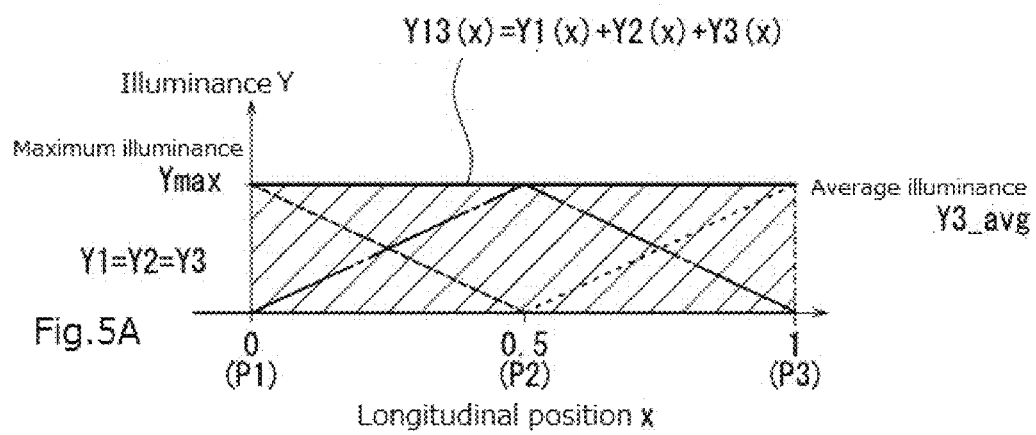
FIGS. 5A to 5C are diagrams explaining illuminance distributions on the entire diffusion plate according to the first embodiment.

As illustrated in FIG. 5A, in a graph in which the illuminance of each of the positions (P1 to P3) of the diffusion plate 41 in the longitudinal direction is indicated in a vertical axis, in a case where each of the optical sources 20(1) to 20(3) emits light in the maximum emission intensity Ymax, the average illuminance Y3_avg of the diffusion plate 41 and each of illuminances Y1 to Y3 of the emission regions W(1) to W(3) become equal to Ymax.

Here, in the present embodiment, the emission intensity of each of the optical sources 20(1) to 20(3) can be changed. Therefore, in a case of changing the emission intensity of each of the optical sources 20(1) to 20(3), the average illuminance Y3_avg of the diffusion plate 41 changes (in a range illustrated in a diagonal line in FIG. 5A).

Figure 5B:
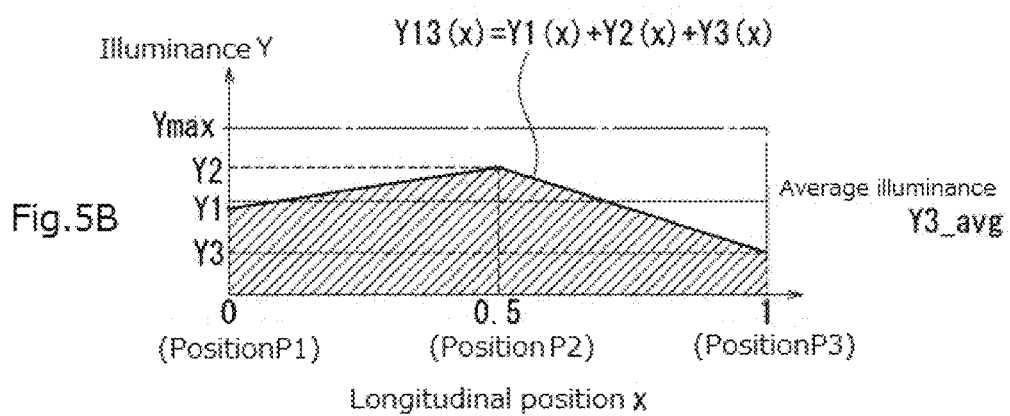

Accordingly, in a case where a relation of the illuminances Y1, Y2, Y3 of the positions P1 to P3 in the emission regions W(1) to W(3) of the respectively optical sources 20(1) to 20(3) is Y2>Y1>Y3, the average illuminance Y3_avg of the diffusion plate 41 becomes an average value of a waveform of Y13(x) as illustrated in FIG. 5B, for example.

Figure 5C:
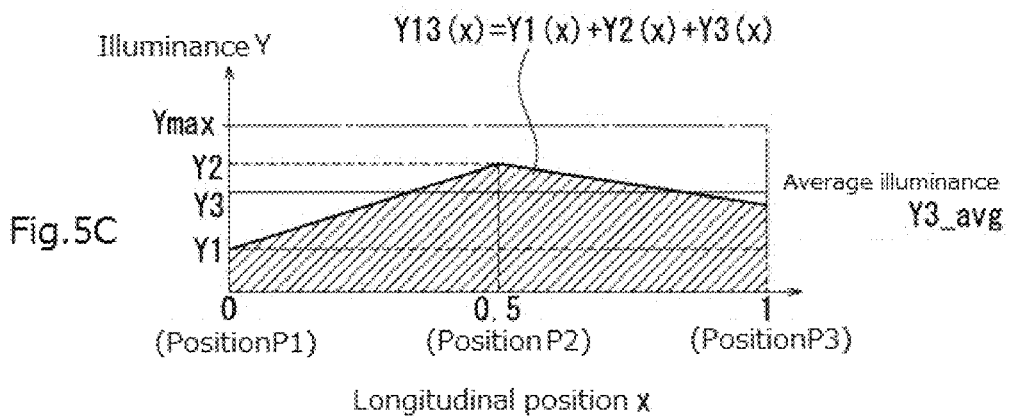

In addition, in a case where a relation of the illuminances Y1, Y2, Y3 of the positions P1 to P3 in the emission regions W(1) to W(3) of the respective optical sources 20(1) to 20(3) is Y2>Y3>Y1, the average illuminance Y3_avg of the diffusion plate 41 becomes an average value of a waveform of Y13(x) as illustrated in FIG. 5C, for example.

In the present embodiment, for carrying out the performance by the light emission of the diffusion plate 41, the average illuminance Y3_avg of the diffusion plate 41 in each time point from start to end of the performance (in the middle of the performance) is preliminarily determined.

In each time point in the middle of the performance, for realizing the average illuminance Y3_avg of the diffusion plate 41 determined to each time point, the lighting-up/lighting-out state of each of the optical sources 20(1) to 20(3) and the emission intensity of the optical source 20 to be lit up are controlled.

In the schedule SC to be referred to at the time of carrying out the performance by the light emission of the diffusion plate 41, the average illuminance Y3_avg of the diffusion plate 41 in each time point in the middle of the performance, the lighting-up/lighting-out state of each of the optical sources 20(1) to 20(3) for realizing the average illuminance Y3_avg in each time point, and the illuminances Y1, Y2, Y3 of the positions P1 to P3 in the emission regions W(1) to W(3) of the optical sources 20(1) to 20(3) to be lit up are defined.

Accordingly, in a case of being composed of a total of "n" pieces of the optical sources as mentioned above, the schedule SC to be referred to at the time of carrying out the emission performance of the diffusion plate 41 is set in the same concept with the performance of the diffusion plate 41 composed of a total of three pieces of the optical sources 20(1) to 20(3).

Figure 6:
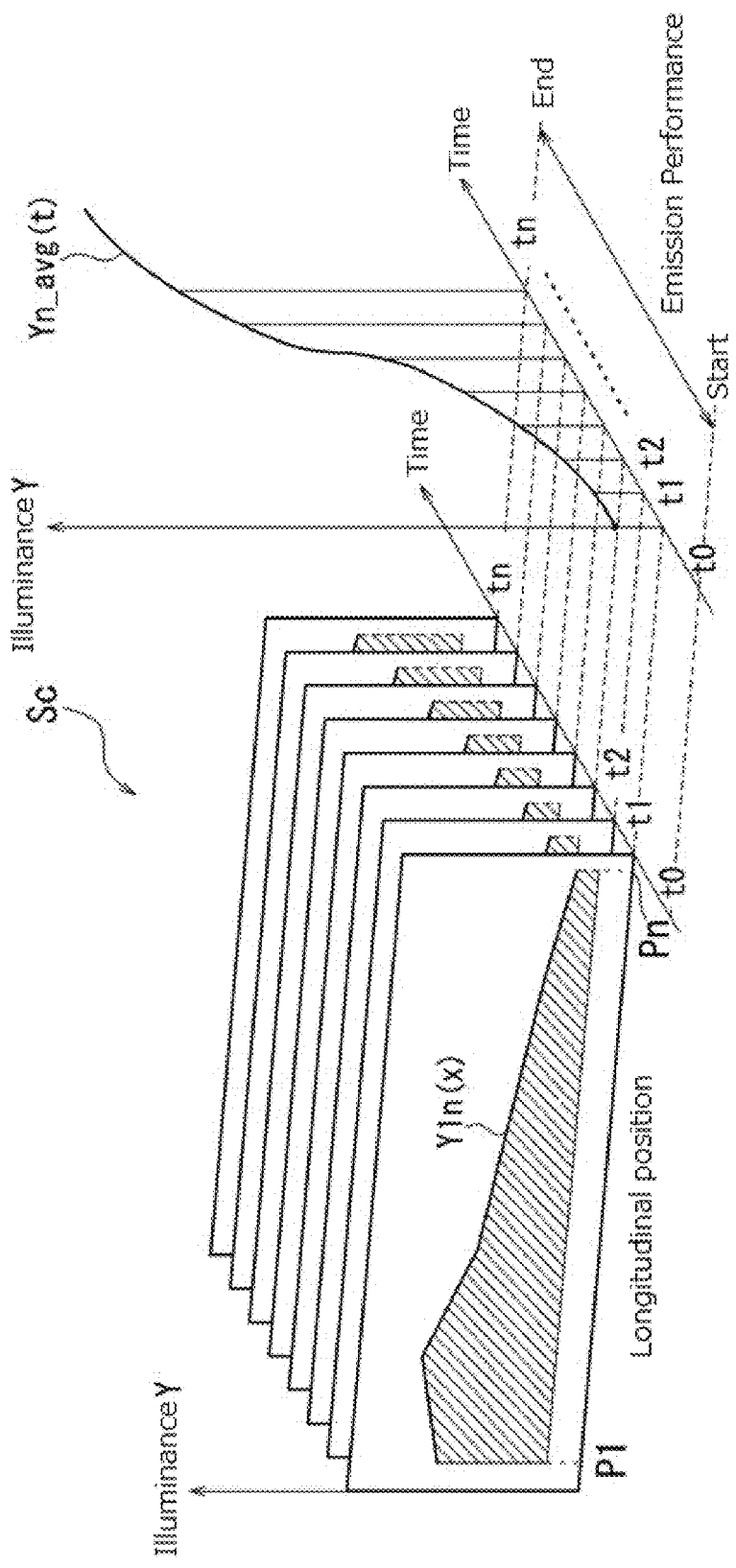
FIG. 6 is a diagram explaining an average illuminance of the diffusion plate and a temporal change in the average illuminance of the diffusion plate in each time point from start to end of an optical performance according to the first embodiment.

Accordingly, as illustrated in FIG. 6, the average illuminance Yn_avg of the diffusion plate 41 in each time point from start (time t0) to end (time tn) of the performance, the lighting-up/lighting-out state of each of the optical sources 20(1) to 20(n) and the emission intensity of the optical sources 20(1) to 20(n) to be lit up for realizing the average illuminance Yn_avg are defined in the schedule SC.

In a case of the illuminating device 1 having a total of "n" pieces of the optical sources, the control unit 30 lights up each of the optical sources 20(1) to 20(n) in the emission intensity defined in the schedule SC in each time point in the middle of the performance, based upon the schedule SC stored in the memory unit 35, thereby causing the diffusion plate 41 to emit light in the designated illuminance in each time point in the middle of the performance and changing the illuminance over time, thus carrying out the scheduled performance.

Here, in the present embodiment, the average illuminance Yn_avg in each time point is set such that the average illuminance Yn_avg of the diffusion plate 41 in each time point in the middle of the performance changes successively without flexion points (refer to FIG. 6).

As a result, since a change in illuminance of the diffusion plate 41 successively changes with regularity without flexion points to lead to no large variations in illuminance in the middle of the performance, travel of the light in the emission performance is easier to be visualized.

Here, an explanation will be made of a change in the average illuminance Yn_avg of the diffusion plate 41 in each time point in the middle of carrying out the performance by taking the average illuminance Yn_avg in a case where the number of the optical sources is three as mentioned above, as an example.

FIGS. 7A to 7D are diagrams explaining a relation between a change in the average illuminance Y3_avg and the optical sources 20(1) to 20(3) corresponding to the illuminance distribution of the diffusion plate 41 in the entire illuminance distribution in the diffusion plate 41 by a total of the three optical sources, wherein FIG. 7A is a diagram illustrating a change in the average illuminance Y3_avg of the diffusion plate 41 in the schedule SC according to the present embodiment, FIG. 7B is a diagram illustrating a change in emission intensity of each of the optical sources 20(1) to 20(3) in a case of FIG. 7A, FIG. 7C is a diagram illustrating a change in the average illuminance Y3_avg in a case of controlling the lighting-up of each of the optical sources 20(1) to 20(3) by the method according to the conventional example not preliminarily considering the average illuminance Y3_avg in the middle of carrying out the performance, and FIG. 7D is a diagram illustrating a change in the emission intensity of each of the optical sources 20(1) to 20(3) in a case of controlling the lighting-up of each of the optical sources 20(1) to 20(3) by the method according to the conventional example.

FIGS. 8A and 8B are diagrams explaining a relation between a change in the average illuminance Y3_avg and the optical sources 20(1) to 20(3) corresponding to the illuminance distribution of the diffusion plate 41 in the entire illuminance distribution in the diffusion plate 41 by a total of the three optical sources, wherein FIG. 8A is a diagram illustrating a change in the average illuminance Y3_avg in a case of controlling the lighting-up/lighting-out of each of the optical sources 20(1) to 20(3) by the method according to the conventional example not preliminarily considering the average illuminance Y3_avg in the middle of carrying out the performance, and FIG. 8B is a diagram illustrating a change in the emission intensity of each of the optical sources 20(1) to 20(3) in a case of controlling the lighting-up/lighting-out of each of the optical sources 20(1) to 20(3) by the method according to the conventional example.

As illustrated in FIG. 7D, in a case of not preliminarily considering the average illuminance Y3_avg in the middle of carrying out the performance, each of the optical sources 20(1) to 20(3) is lit up in order.

In this case, as illustrated in FIG. 7C, the average illuminance Y3_avg of the light emitted from the diffusion plate 41 successively changes with flexion points, and the travel of the light is not smoothly performed in this case.

In addition, as illustrated in FIG. 8A, in a case of not preliminarily considering the average illuminance Y3_avg in the middle of carrying out the performance, when each of the optical sources 20(1) to 20(3) is lit up/lit out in order, as illustrated in FIG. 8A the average illuminance Y3_avg of the light emitted from the diffusion plate 41 successively changes with flexion points. Therefore, the travel of the light is not smoothly performed in this case as well.

In contrast thereto, in the schedule SC of the present embodiment, the average illuminance Y3_avg in each time point in the middle of carrying out the performance is in advance set in such a manner as to change successively in a curved shape without flexion points (refer to FIG. 7A and FIG. 6).

Therefore, the emission intensity of each of the optical sources 20(1) to 20(3) in each time point in the middle of carrying out the performance changes over time as illustrated in FIG. 7B for realizing a change in the average illuminance Y3_avg.

Here, a temporal change in the average illuminance Y3_avg of the diffusion plate 41 shows a temporal change in brightness of an entire emission surface of the diffusion plate 41 in the middle of carrying out the performance, and the brightness more smoothly changes without strange feelings as compared to the conventional example of lighting up the optical sources 20(1) to 20(3) in order.

Accordingly, the travel of the light in the travel performance of the light is smoothly performed.

It should be noted that the temporal change in the average illuminance Y3_avg in each time point in the middle of carrying out the performance is not successively made in a curved shape without flexion points, but may be made successively in a linear shape.

For example, as illustrated in FIG. 9A, a change in the average illuminance Y3_avg in a case of carrying out the illumination performance on the optical flow may decrease successively in a linear shape after increasing successively in a linear shape.

In addition, as illustrated in FIG. 9C, a change in the average illuminance Y3_avg in a case of carrying out the illumination performance on the optical flow may decrease successively in a curved shape without flexion points after increasing successively in a curved shape without flexion points.

Also in a case of this configuration, the lighting-up/lighting-out state of each of the optical sources 20(1) to 20(3) and the emission intensity of the optical source to be lit up are controlled for realizing the average illuminance Y3_avg in each time point in the middle of carrying out the performance. Thereby, the lighting-up/lighting-out state of each of the optical sources 20(1) to 20(3) and the emission intensity at the lighting-up are controlled to change in the form as illustrated in FIG. 9B or FIG. 9D.

Accordingly, in a case of increasing/decreasing a change in the average illuminance Y3_avg successively in a linear shape without flexion points, the travel of the light having constant speed feelings can be performed.

In addition, in a case of increasing/decreasing a change in the average illuminance Y3_avg successively in a curved shape without flexion points, the travel of the light having acceleration/deceleration feelings can be performed.

Further, in the present embodiment, at the time of changing the average illuminance Yn_avg of the diffusion plate 41 successively in a curved shape or in a linear shape without flexion points according to the schedule SC, the illuminance distribution of the diffusion plate 41 in the longitudinal direction linearly increases or decreases from the one end 410 toward the other end 411-side in the longitudinal direction.

Figure 10A:
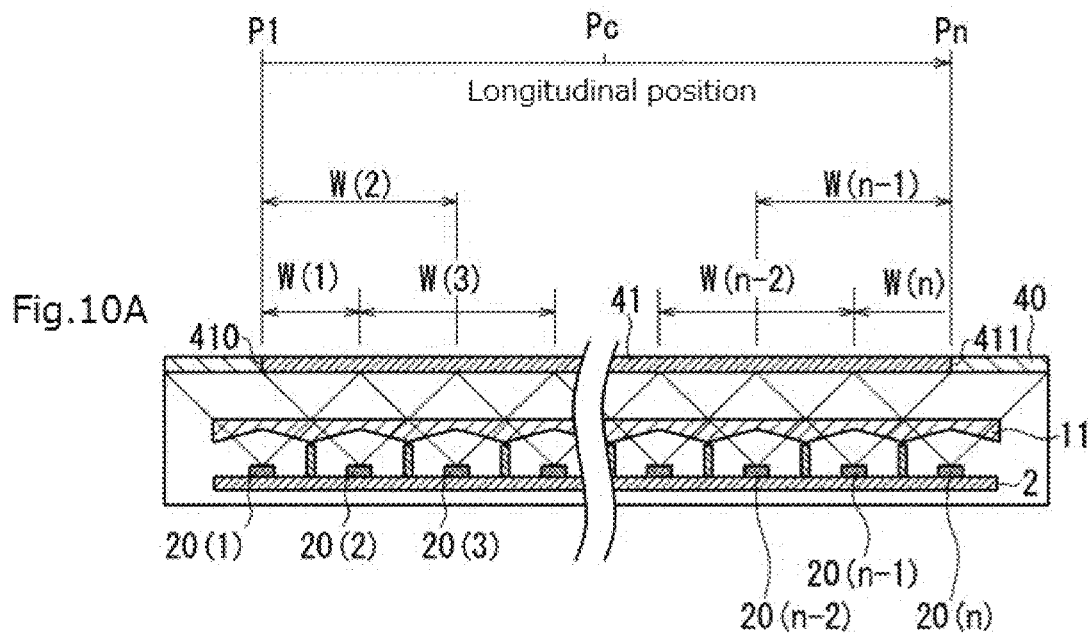
FIGS. 10A to 10C are diagrams explaining a change in the illuminance of the diffusion plate in a longitudinal direction according to the first embodiment.
Figure 10B:
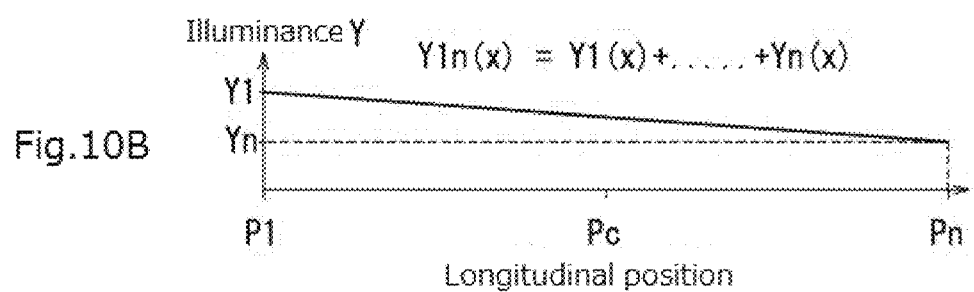

Specifically, in a case of making illuminance Y1 in the one end 410-side (refer to FIG. 10A) of the diffusion plate 41 in the longitudinal direction larger than illuminance Yn in the other end 411-side (Y1>Yn) in each time point in the middle of carrying out the performance, it is preferable that, after setting the illuminance Y1 in the region W(1) in the one end 410-side in the longitudinal direction and the illuminance Yn in the region W(n) in the other end 411-side in the longitudinal direction, the illuminance Y2 to the illuminance Yn−1 in the region W(2) to the region W(n−1) between the region W(1) and the region W(n) are successively made smaller in a linear shape (refer to FIG. 10B).

Figure 10C:
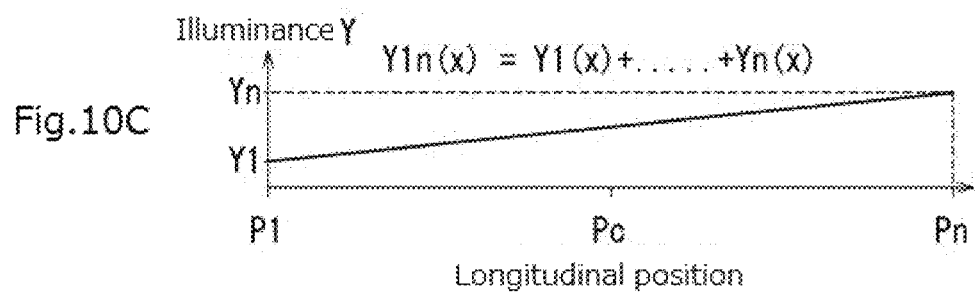
Figure 11A:
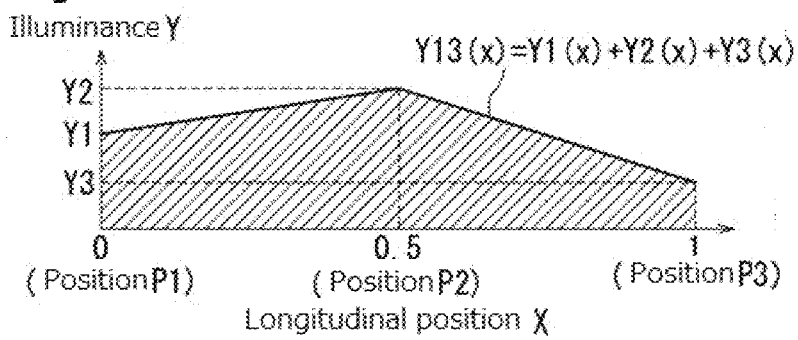
FIGS. 11A to 11D are diagrams explaining a temporal change in an average illuminance and a gravity center of a diffusion plate according to a second embodiment.
Figure 11B:
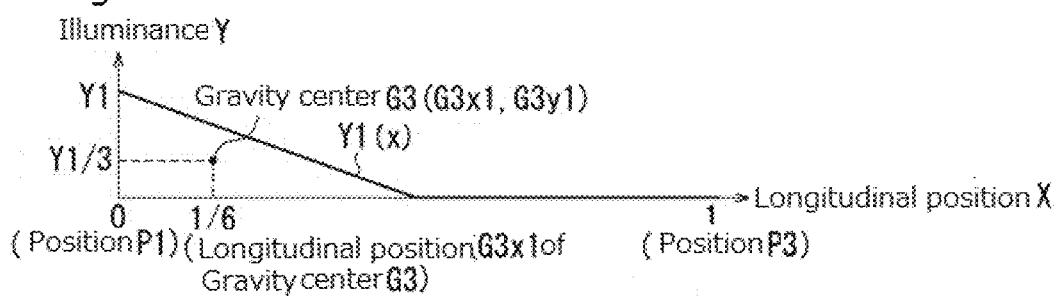
Figure 11C:
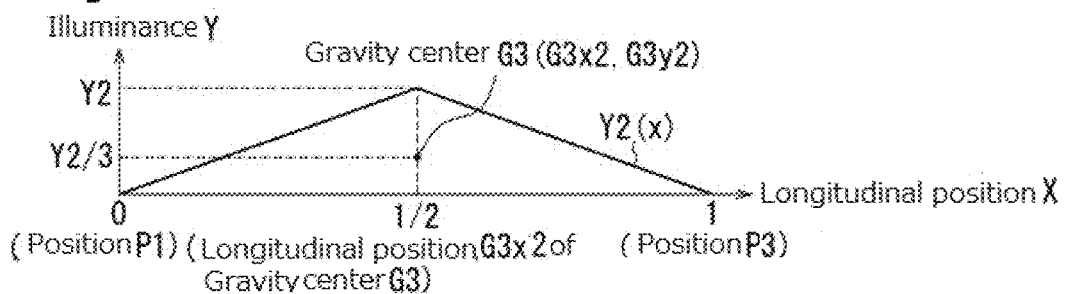
Figure 11D:
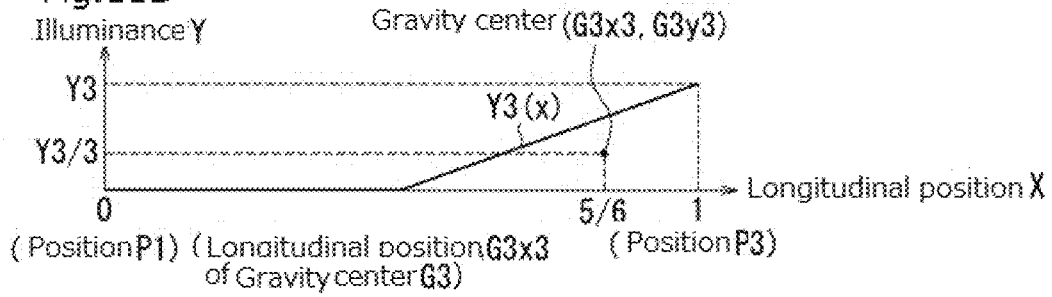

In addition, in a case of making illuminance Y1 in the one end 410-side (refer to FIG. 10A) in the longitudinal direction smaller than the illuminance Yn in the other end 411-side (Y1<Yn), after setting the illuminance Y1 in the region W(1) in the one end 410-side in the longitudinal direction and the illuminance Yn in the region W(n) in the other end 411-side in the longitudinal direction, it is preferable that the illuminance Y2 to the illuminance Yn−1 in the region W(2) to the region W(n−1) between the region W(1) and the region W(n) successively increase in a linear shape (refer to FIG. 10C).

With this configuration, in the diffusion plate 41 the illuminance successively increases (decreases) in a predetermined ratio from the one end 410 toward the other end 411 in the longitudinal direction.

Then, the illuminance Y2 to the illuminance Yn−1 in the region W(2) to the region W(n−1) between the region W(1) and the region W(n) can be calculated together only by setting the illuminance Y1 in the region W(1) in the one end 410-side in the longitudinal direction and the illuminance Yn in the region W(n) in the other end 411-side in the longitudinal direction.

As a result, the setting of the schedule SC becomes easy, a decrease in a working cost required for setting the schedule SC is made possible to expect a reduction in development costs.

As described above, in the present embodiment, (1) the illuminating device comprises:

the plurality of optical sources 20(1) to optical sources 20(n);

the band-shaped diffusion plate 41 having the plurality of emission regions W(1) to emission regions W(n) corresponding on a one-to-one basis to the plurality of the optical sources 20(1) to the optical sources 20(n) respectively; and the control unit 30 configured to control lighting-up/lighting-out and an emission intensity of each of the optical source 20(1) to the optical source 20(n) based upon the schedule SC stored in the memory unit 35 and at the time of carrying out the performance on the optical travel by the diffusion plate 41, each of the emission region W(2) to the emission region W(n−1) in the plurality of emission region W(1) to emission region W(n) having the predetermined length L in the longitudinal direction of the diffusion plate 41, and the emission region W(1) and the emission region W(n) each having the predetermined length L/2, and the plurality of emission region W(1) to emission region W(n) being provided in the diffusion plate 41 to extend in the longitudinal direction, wherein in the diffusion plate 41, each of the emission region W(2) to the emission region W(n−1) between the emission region W(1) positioned in the one end 410 and the emission region W(n) positioned in the other end 411 in the longitudinal direction is arranged to overlap the other emission region adjacent in the longitudinal direction in a predetermined range (range of a length of L/2) of both side portions in the longitudinal direction, and in the schedule SC, the light-up/light-out state of each of the plurality of optical sources 20(1) to 20(n) and the emission intensity of each of the optical sources 20(1) to 20(n) to be lit up are set based upon the average illuminance Yn_avg in the illuminance distribution of the entire diffusion plate 41 found by combining the illuminances of the lights emitted from the plurality of emission region W(1) to emission region W(n) respectively, and for realizing the temporal change Yn_avg (t) of the preset average illuminance, the light-up/light-out state of each of the plurality of optical source 20(1) to optical source 20(n) and the emission intensity of the optical source 20(1) to the optical source 20(n) to be lit up in each time point in the middle of carrying out the performance are set.

According to this configuration, in the illuminating device 1, the light-up/light-out state of each of the plurality of optical source 20(1) to the optical source 20(n) and the emission intensity of the optical source to be lit up in each time point in the middle of carrying out the performance on the optical travel in the diffusion plate 41 are controlled to realize the temporal change of the average illuminance Yn_avg in the illuminance distribution of the entire diffusion plate 41 (average illuminance Yn_avg of the diffusion plate 41).

Thereby, the schedule SC is made such that for carrying out the performance on the optical travel in the diffusion plate 41, one reference of the average illuminance Yn_avg of the entire diffusion plate 41 is added at the time of setting the light-up/light-out state of each of the optical source 20(1) to the optical source 20(n) and the emission intensity of the optical source to be lit up, and for giving the temporal order to the added reference, the light-up/light-out state of each of the optical source 20(1) to the optical source 20(n) and the emission intensity of the optical source to be lit up are set. Therefore, it is possible to cause the light to be visualized in such a manner as to smoothly travel at the time of carrying out the performance on the optical travel in the diffusion plate 41.

Accordingly, the performance on the optical travel in the diffusion plate 41 can be more appropriately carried out and it is possible to further enhance the performance effect of the light.

(2) The temporal change in the average illuminance of the diffusion plate 41 is set such that in each time point of the middle of carrying out the performance, the average illuminance Yn_avg of the diffusion plate 41 successively increases or decreases in the curved shape or in the linear shape without flexion points (refer to FIG. 6, FIG. 7A, FIG. 9A and FIG. 9C).

With this configuration, at the time of carrying out the performance on the optical travel in the diffusion plate 41, the average illuminance Yn_avg of the diffusion plate 41 in each time point in the middle of carrying out the performance successively increases or decreases without flexion points.

The temporal change Yn_avg (t) of the average illuminance in the diffusion plate 41 shows a change in brightness of the entire emission surface (light emitting surface) of the diffusion plate 41 in each time point in the middle of carrying out the performance, and upon successively increasing or decreasing the average illuminance Yn_avg without flexion points, the optical travel in the travel performance of the light is visualized to be smoothly performed.

Accordingly, in a case of increasing/decreasing the average illuminance Yn_avg successively in the linear shape without flexion points, the travel of the light having constant speed feelings can be performed.

In addition, in a case of increasing/decreasing the average illuminance Yn_avg successively in the curved shape without flexion points, the travel of the light having acceleration/deceleration feelings can be performed.

(3) In the diffusion plate 41 in each time point in the middle of carrying out the performance, the emission intensity of each of the optical source 20(1) to the optical source 20(n) is set such that the distribution of the illuminance Y of the diffusion plate 41 in the longitudinal direction successively increases or decreases in the linear shape without flexion points from the one end 410 toward the other end 411 of the diffusion plate 41 in the longitudinal direction (refer to FIGS. 10B and 10C).

With this configuration, in the diffusion plate 41 in each time point in the middle of carrying out the performance, the emission intensity of each of the optical source 20(1) to the optical source 20(n) is set such that the distribution of the illuminance Y of the diffusion plate 41 in the longitudinal direction successively increases or decreases in the linear shape. At this moment, only by determining the emission intensity of the optical source 20(1) corresponding to the emission region W(1) in the one end 410-side in the longitudinal direction and the emission intensity of the optical source 20(N) corresponding to the emission region W(n) in the other end 411-side in the longitudinal direction, the remaining optical sources 20(2) to 20(n−1) are determined uniquely.

Therefore, it is possible to shorten the time required from the setting of the average illuminance in each time point in the middle of carrying out the performance in the schedule SC to the determination of the emission intensity of each of the optical sources 20(1) to 20(n) for realizing the entire emission intensity in each time point.

Second Embodiment

Hereinafter, an explanation will be made of the other control form of the light-up/light-out state of each of the optical source 20(1) to the optical source 20(n) and the emission intensity of the optical source 20 to be lit up as defined in the schedule SC.

FIGS. 11A to 11D are diagrams explaining an entire illuminance distribution of the diffusion plate 41 in each time point in the middle of carrying out the performance and a gravity center to a shape in a hatched part indicating the illuminance distribution when a longitudinal direction of the diffusion plate 41 is indicated at "x" and an illuminance direction thereof is indicated at "y" (hereinafter, called a gravity center Gin an illuminance distribution shape).

The present embodiment as mentioned before has exemplified a case of changing over time the average illuminance Yn_avg of the entire illuminance distribution of the diffusion plate 41 in each time point in the middle of carrying out the performance.

The second embodiment is configured to, at the time of changing over time the average illuminance Yn_avg of the entire illuminance distribution of the diffusion plate 41 in each time point in the middle of carrying out the performance, change the entire illuminance distribution on a basis of a position of a gravity center G in the illuminance distribution shape in each time point.

Here, the gravity center Gin the illuminance distribution shape is a gravity center G (gravity center Gx in the longitudinal direction and gravity center Gy in the illuminance direction) to a shape in a hatched part when a longitudinal direction of the diffusion plate 41 is indicated at "x" and an illuminance direction thereof is indicated at "y" in Y13 of an entire illuminance distribution found by combining illuminance distributions of the lights emitted from the emission region W(1) to emission region W(n) of the diffusion plate 41 respectively.

Here, an explanation will be made of a gravity center G3 in the illuminance distribution shape by taking a case of the entire illuminance distribution of the diffusion plate 41 by a total of three optical sources 20(1) to 20(3), as an example.

As described above, the average illuminance Y3_avg of the illuminance distribution in the diffusion plate 41 can be represented according to the following formula (1) when a length L1 of the diffusion plate 41 is indicated at [1], an illuminance peak (maximum illuminance) by the optical source 20(1) is indicated at Y1, an illuminance peak by the optical source 20(2) is indicated at Y2 and an illuminance peak by the optical source 20(3) is indicated at Y3.

[Formula 2]

$$Y3\_ave = \frac{(Y1 + 2 \times Y2 + Y3)}{4} \tag{1}$$

In addition, it is possible to calculate the gravity center G3 in the illuminance distribution shape composed of Y13(x) in a total of the respective illuminance distributions Y1(x), Y2(x), Y3(x) by the respective optical sources 20(1) to 20(3), as a gravity center G3x of the diffusion plate 41 in the longitudinal direction and a gravity center G3y of the diffusion plate 41 in the illuminance direction.

Here, a component G3x of the gravity center G3 in the longitudinal direction of the diffusion plate 41 can be calculated from the following formula (2) using:

(a) the gravity center (G3x1) in the longitudinal direction of the illuminance distribution in a case of lighting up only the optical source 20(1), (b) the gravity center (G3x2) in the longitudinal direction of the illuminance distribution in a case of lighting up only the optical source 20(2), (c) the gravity center (G3x3) in the longitudinal direction of the illuminance distribution in a case of lighting up only the optical source 20(3), (d) the illuminance peak Y1 by the optical source 20(1), (e) the illuminance peak Y2 by the optical source 20(2), and (f) the illuminance peak Y3 by the optical source 20(3).

[Formula 3]

$$G3x = \frac{(G3x1 \times Y1 + 2 \times G3x2 \times Y2 + G3x3 \times Y3)}{Y1 + 2 \times Y2 + Y3} \quad (2)$$

Likewise, the gravity center G3y of the gravity center G3 in the illuminance direction of the diffusion plate 41 also can be calculated from the following formula (3).

[Formula 4]

$$G3y = \frac{1}{3} \times \frac{(Y1 + Y2) \times Y1 + 2 \times Y2^2 + (Y2 + Y3) \times Y3}{Y1 + 2 \times Y2 + Y3} \quad (3)$$

It should be noted that G3x1, G3x2 and G3x3 are respectively the following fixed values.

[Formula 5]

$$G3x1 = \frac{1}{6}, \; G3x2 = \frac{1}{2}, \; G3x3 = \frac{5}{6}$$

Here, an explanation will be made of a change in the gravity center G3 in the entire illuminance distribution shape in each time point in the middle of carrying out the performance by taking a case of the entire illuminance distribution of the diffusion plate 41 by a total of the three optical sources 20(1) to 20(3) as mentioned above, as an example.

FIGS. 12A to 12D are diagrams explaining a relation between a change in a gravity center G3x in the longitudinal direction of the entire illuminance distribution shape of the diffusion plate 41 by a total of the three optical sources 20(1) to 20(3) and the emission intensity of each of the optical sources 20(1) to 20(3), wherein FIG. 12A is a diagram illustrating a change in the gravity center G3x in the longitudinal direction of an entire illuminance distribution shape in the schedule SC according to the present embodiment, FIG. 12B is a diagram illustrating a change in the emission intensity of each of the optical sources 20(1) to 20(3) in a case of FIG. 12A, FIG. 12C is a diagram illustrating a change in the gravity center G3x of the entire illuminance distribution shape in a case of controlling the lighting-up/lighting-out of each of the optical sources 20(1) to 20(3) by the method according to the conventional example not using the change in the gravity center G3x of the illuminance distribution shape, and FIG. 12D is a diagram illustrating a change in the emission intensity of each of the optical sources 20(1) to 20(3) in a case of controlling the lighting-up/lighting-out of each of the optical sources 20(1) to 20(3) by the method according to the conventional example.

In a case of successively not changing the gravity center G3x of the entire illuminance distribution shape in the middle of carrying out the performance without flexion points, as illustrated in FIG. 12D the lighting-up and lighting-out in each of the optical source 20(1) to the optical source 20(3) are performed in that order.

In this case, the gravity center G3x of the entire illuminance distribution shape in the middle of carrying out the performance in each time point successively changes with flexion points as illustrated in FIG. 12C following a temporal change in the entire illuminance distribution of the diffusion plate 41 in each time point in the middle of carrying out the performance.

The travel of the light in this case is a travel not accompanied by smoothness of the travel.

In contrast thereto, in the schedule SC according to the present embodiment, the gravity center G3x of the entire illuminance distribution shape in each time point in the middle of carrying out the performance is successively increased in a curved shape without flexion points (refer to FIG. 12A).

Therefore, the emission intensity of each of the optical sources 20(1) to 20(3) in each time point in the middle of carrying out the performance changes over time as illustrated in FIG. 12B for realizing a change in the gravity center G3x of the entire illuminance distribution shape.

Here, when the temporal change in the illuminance distribution of the diffusion plate 41 is set on a basis of the gravity center G3x of the entire illuminance distribution shape, since the entire illuminance distribution in each time point in the middle of carrying out the performance is always set on a basis of a large point of brightness weighting, the travel of the light in the travel performance of the light is visualized to be smoothly performed.

It should be noted that a change in the gravity center G3x of the entire illuminance distribution shape in each time point in the middle of carrying out the performance is not successively made in the curved shape without flexion points, but may be successively made in a linear shape without flexion points.

Figure 13A:
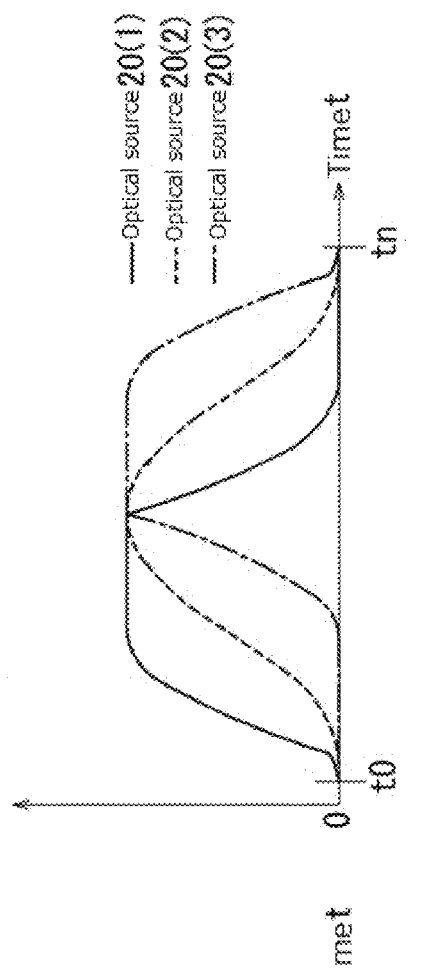
FIGS. 13A and 13B are diagrams explaining a temporal change in a gravity center in an illuminance distribution of the diffusion plate and a change in an emission intensity of each of optical sources in this case according to the second embodiment.
Figure 13B:
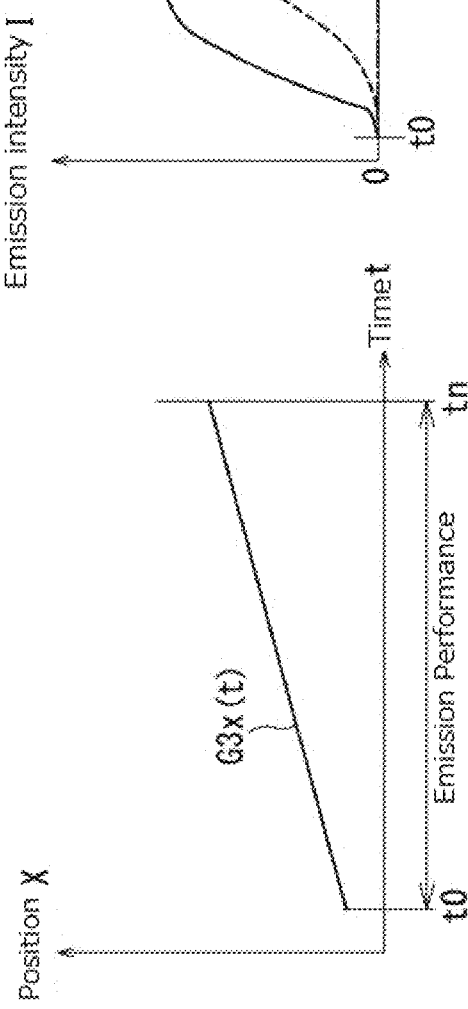

For example, as illustrated in FIG. 13A, a change in the gravity center G3x of the entire illuminance distribution shape in a case of carrying out the illumination performance on an optical flow may be successively made in a linear shape without flexion points.

Even with this configuration, in a case of successively increasing/decreasing the change in the gravity center G3x of the entire illuminance distribution shape in the linear shape, the travel of the light having constant speed feelings can be performed.

In addition, in a case of successively increasing/decreasing the change in the gravity center G3x of the entire illuminance distribution shape in the curved shape, the travel of the light having acceleration/deceleration feelings can be performed.

Figure 14:
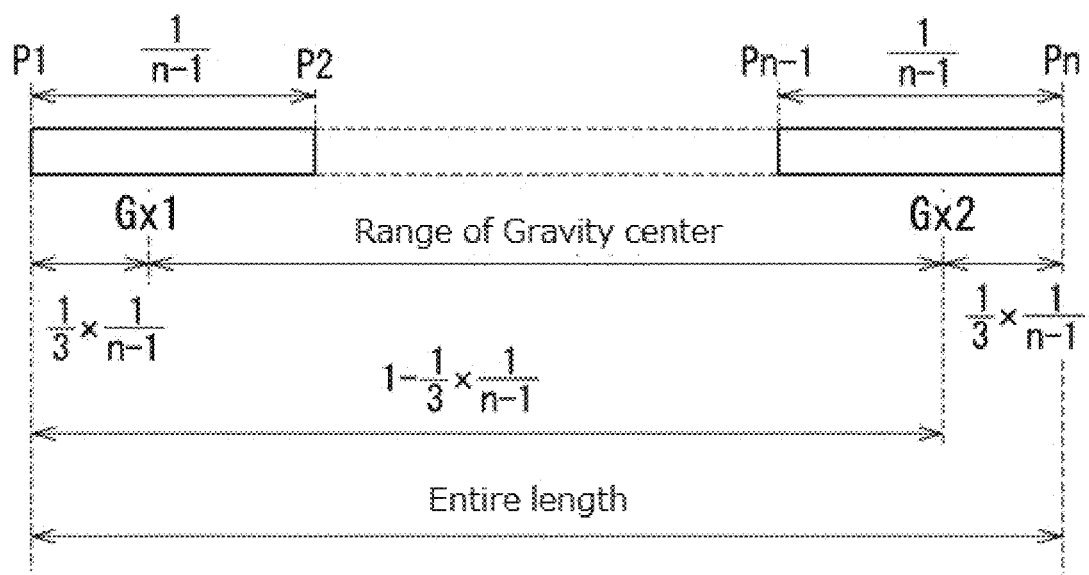
FIG. 14 is a diagram explaining a range of the gravity center in the illuminance distribution of the diffusion plate according to the second embodiment.

Here, a setting range of the gravity center G3x of the entire illuminance distribution shape as described before is preferably a range from a position of the gravity center Gx1 in the longitudinal direction in the emission region W(1) on the one end 410 in the diffusion plate 41 to a position of the gravity center Gx2 in the longitudinal direction in the emission region W(n) on the other end 411 in the diffusion plate 41 (refer to FIG. 14).

When the emission intensity of the optical source 20 is set based upon the position of the gravity center Gx3 in the entire illuminance distribution shape, in some cases the emission intensity of each of the optical sources 20(1) and 20(n) corresponding to the emission regions W(1) and W(n) positioned in the one end 410 and in the other end 411 in the longitudinal direction is minus.

Therefore, it is possible to eliminate a region where the emission intensity is possibly minus at the time of calculating the gravity center. Then, it is appropriately possible to prevent the emission intensity of each of the optical sources 20(1) and 20(n) set based upon the gravity center G3x of the entire illuminance distribution shape from being an inappropriate emission intensity.

Here, in the present embodiment, the emission intensity of each of the plurality of optical sources 20(1) to 20(n) defined in the schedule SC is, when a gravity center Gx of an illuminance distribution shape fln(x) is determined, an emission intensity calculated based upon the determined gravity center Gx.

It should be noted that when an explanation is made by taking a case where the number of optical sources is three, as an example, as illustrated in FIG. 15 at the time of setting the emission intensity of each of the plurality of optical sources 20(1) to 20(n) defined in the schedule SC, in some cases there is an optical source the emission intensity of which calculated based upon the gravity center G3x of the illuminance distribution shape source 20(1) becomes minus (after time tb in the optical source 20(1) before time to of the optical source 20(3) in FIG. 15A).

In this case, based upon a gravity center of an illuminance distribution shape expressed from an illuminance distribution in the emission region W(2) corresponding to the other optical source 20(2) excluding the optical sources 20(1) and 20(3) an emission intensity I of which is minus, it is preferable that an emission intensity of each of the other optical sources 20(1) and 20(3) is set and an emission intensity of each of the optical sources 20(1) and 20(3) the calculated emission intensity of which is minus is set to zero.

In this case, after excluding the optical source of unrealizable emission intensity, it is possible to set an emission intensity capable of realizing the gravity center Gx of the illuminance distribution shape fln(x) to the remaining optical sources.

As described above, in the second embodiment, (4) the illuminating device comprises:

the plurality of optical source 20(1) to optical source 20(n);

the band-shaped diffusion plate 41 having the plurality of emission region W(1) to emission region W(n) corresponding on a one-to-one basis to the plurality of the optical source 20(1) to the optical source 20(n) respectively; and the control unit 30 configured to control lighting-up/lighting-out and an emission intensity of each of the optical source 20(1) to the optical source 20(n) based upon the schedule SC stored in the memory unit 35 and at the time of carrying out the performance on an optical travel by the diffusion plate 41, each of the emission region W(2) to then emission region W(n−1) in the plurality of emission region W(1) to emission region W(n) having the predetermined length L in the longitudinal direction of the diffusion plate 41, and the emission region W(1) and the emission region W(n) each having the predetermined length L/2, and the plurality of emission region W(1) to emission region W(n) being provided to successively extend in the longitudinal direction in the diffusion plate 41, wherein in the diffusion plate 41, each of the emission region W(2) to the emission region W(n−1) between the emission region W(1) positioned in the one end 410 and the emission region W(n) positioned in the other end 411 in the longitudinal direction respectively are arranged to overlap the other emission region adjacent in the longitudinal direction in a predetermined range (range of a length of L/2) of both side portions in the longitudinal direction, and in the schedule SC, the light-up/light-out state of each of the plurality of optical sources 20(1) to 20(n) and the emission intensity of each of the optical sources 20(1) to 20(n) to be lit up are set based upon the gravity center G of the illuminance distribution shape when an illuminance distribution of the entire diffusion plate 41 found by combining the illuminances of lights emitted from the emission region W(1) to the emission region W(n) of the diffusion plate 41 respectively is expressed in the illuminance distribution shape by setting a position of the diffusion plate 41 in the longitudinal direction to an "x" direction and a magnitude of the illuminance in each position in the longitudinal direction to a "y" direction, and for realizing the temporal change in the gravity center G of the preset illuminance distribution shape in the longitudinal direction of the diffusion plate 41, the light-up/light-out state of each of the plurality of optical source 20(1) to optical source 20(n) and the emission intensity of each of the optical source 20(1) to the optical source 20(n) to be lit up in each time point in the middle of carrying out the performance are set.

According to this configuration, at the time of carrying out the performance on the optical travel in the diffusion plate 41, the light-up/light-out state of each of the plurality of optical source 20(1) to the optical source 20(n) and the emission intensity of the optical source to be lit up are controlled to realize the temporal change in the gravity center Gx of the illuminance distribution shape of the entire diffusion plate 41.

Thereby, the schedule SC is made such that, for carrying out the performance on the optical travel in the diffusion plate 41, one reference of the gravity center Gx in the illuminance distribution shape of the entire diffusion plate 41 is added at the time of setting the light-up/light-out state of each of the optical source 20(1) to the optical source 20(n) and the emission intensity of the optical source to be lit up, and for giving the temporal order to the added reference, the light-up/light-out state of each of the optical source 20(1) to the optical source 20(n) and the emission intensity of the optical source to be lit up are set. Therefore, it is possible to cause the light to be visualized in such a manner as to smoothly travel at the time of carrying out the performance on the optical travel in the diffusion plate 41.

Accordingly, the performance on the optical travel in the diffusion plate 41 can be more appropriately performed and it is possible to further enhance the performance effect of the light.

(5) The temporal change in the gravity center G of the illuminance distribution shape in the longitudinal direction of the diffusion plate 41 is set such that in each time point in the middle of carrying out the performance, the gravity center G of the illuminance distribution shape successively increases or decreases in the curved shape or in the linear shape without flexion points.

With this configuration, at the time of carrying out the performance on the optical travel in the diffusion plate 41, the gravity center Gx of the illuminance distribution shape in the entire diffusion plate 41 in each time point in the middle of carrying out the performance successively increases or decreases without flexion points.

The temporal change in the gravity center Gx of the illuminance distribution shape in the entire diffusion plate 41 shows a change in a center position of brightness weighting of the entire emission surface in the diffusion plate 41 in the middle of carrying out the performance, and upon successively increasing or decreasing the gravity center Gx of the entire illuminance distribution shape, the optical travel of the travel performance of the light is visualized to be smoothly made.

Accordingly, in a case of successively increasing/decreasing a change in the entire illuminance distribution in the linear shape, the travel of the light having constant speed feelings can be performed.

In addition, in a case of successively increasing/decreasing a change in the entire illuminance distribution in the curved shape, the travel of the light having acceleration/deceleration feelings can be performed.

Here, in the present embodiment, (6) the emission intensity of each of the plurality of optical sources $20(1)$ to $20(n)$ defined in the schedule SC is an emission intensity calculated based upon the gravity center Gx of the illuminance distribution shape fln(x).

At the time of setting the emission intensity of each of the plurality of optical sources $20(1)$ to $20(n)$ defined in the schedule SC, in a case there is an optical source in which the emission intensity calculated based upon the gravity center of the illuminance distribution shape is minus, based upon a gravity center of an illuminance distribution shape expressed from an illuminance distribution in the emission region corresponding to the other optical source excluding the optical source the emission intensity of which is minus, an emission intensity of the other optical source is set and an emission intensity of the optical source the calculated emission intensity of which is minus is set to zero.

Thus in a case of setting the emission intensity of each of optical sources $20(1)$ to $20(n)$ based upon the gravity center Gx of the illuminance distribution shape in the entire diffusion plate 41, when the set emission intensity of each of optical sources $20(1)$ to $20(n)$ is minus, a gravity center Gnxm and an illuminance peak Ynm to the illuminance distribution of each emission region W(m) of the diffusion plate 41 corresponding to each optical source $20(m)$ that is minus are excluded from a formula for calculating the gravity center Gnxm of the illuminance distribution shape in the entire diffusion plate 41.

Thereby, after excluding the optical source of unrealizable emission intensity, it is possible to set the emission intensity capable of realizing the gravity center Gx of the illuminance distribution shape fln(x) to the remaining optical sources.

With the above configuration, after excluding the region possibly causing the emission intensity of each of the optical sources $20(1)$ and $20(n)$ to be minus, at the time of calculating the gravity center G3 of the illuminance distribution shape in the entire diffusion plate 41, it is possible to set the emission intensity of each of the optical sources $20(1)$ and $20(n)$, thus appropriately preventing the emission intensity from becoming the unrealizable minus value.

Therefore, since it is possible to change the position of the gravity center Gx of the illuminance distribution shape in each time point in the middle of carrying out the performance along a predetermined track, the travel of the light in the performance on the optical travel can be smoothly made.

Third Embodiment

The second embodiment as described above has exemplified a case where the light-up/light-out state of each of the plurality of optical source $20(1)$ to optical source $20(n)$ and the emission intensity of each of the optical source $20(1)$ to the optical source $20(n)$ to be lit up in each time point in the middle of carrying out the performance are set for changing over time in the longitudinal direction of the diffusion plate 41 the position of the gravity center Gx in the illuminance distribution in the entire diffusion plate 41 in each time point in the middle of carrying out the performance.

Here, at the time of setting the light-up/light-out state of each of the plurality of optical source $20(1)$ to optical source $20(n)$ and the emission intensity of each of the optical source $20(1)$ to the optical source $20(n)$ to be lit up in each time point in the middle of carrying out the performance, a change in a gravity center Gy of the illuminance distribution shape in the entire diffusion plate 41 in the illuminance direction may be added as a reference.

Here, an explanation will be made of a change in the illuminance direction in the gravity center Gy in the illuminance distribution shape in each time point in the middle of carrying out the performance by taking a case of the illuminance distribution shape of the entire diffusion plate 41 by a total of three optical sources $20(1)$ to $20(3)$ as described above, as an example.

FIGS. 16A to 16C and FIGS. 17A to 17C are diagrams explaining a relation between a change in a gravity center of the illuminance distribution shape of the entire diffusion plate 41 (a change in a gravity center Gx in the longitudinal direction of the diffusion plate 41, and a change in a gravity center Gy in the illuminance direction) and the emission intensity of each of the optical sources $20(1)$ to $20(3)$.

Figure 16B:
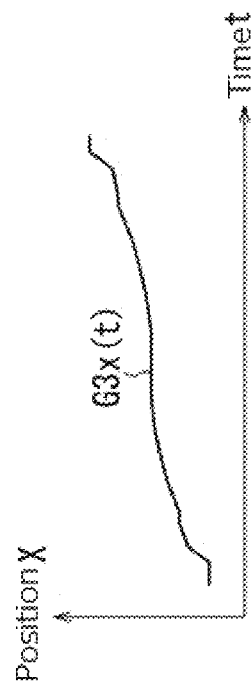
FIGS. 16A to 16C are diagrams explaining a relation between a change in the gravity center in the illuminance distribution of the diffusion plate and the emission intensity of the optical source according to the second embodiment.
Figure 16C:
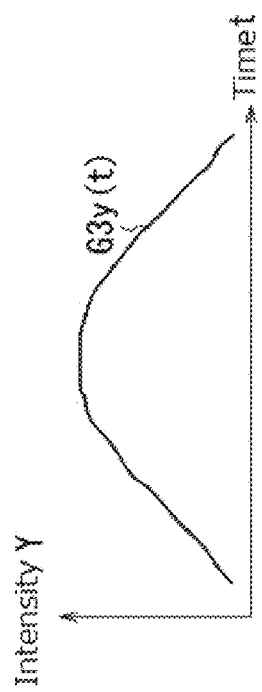
Figure 16A:
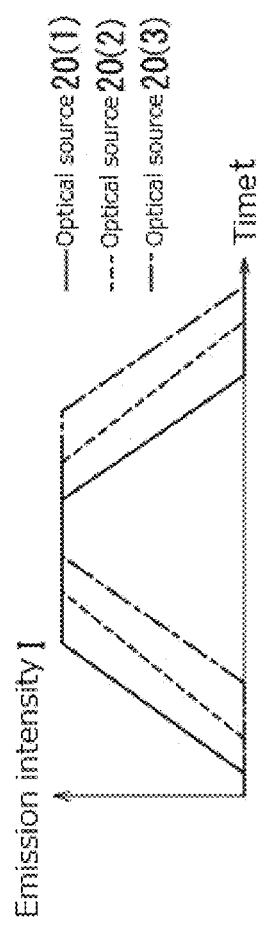
Figure 17B:
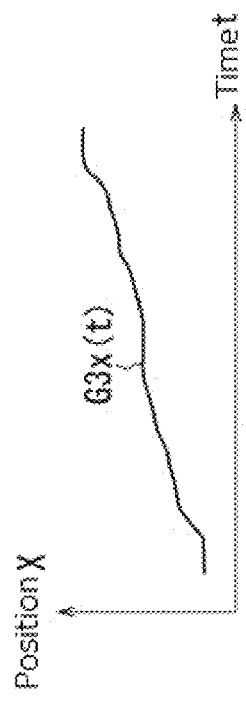
FIGS. 17A to 17C are diagrams explaining a relation between a change in the gravity center in the illuminance distribution of the diffusion plate and the emission intensity of the optical source according to the second embodiment.
Figure 17C:
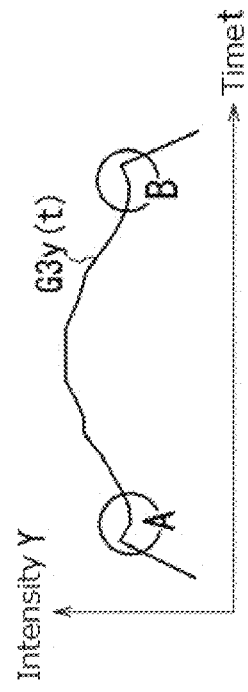

In FIGS. 16A to 16C and FIGS. 17A to 17C, FIGS. 16A and 17A illustrate a temporal change in the emission intensity of each of the optical sources $20(1)$ to $20(3)$ in the schedule SC. FIGS. 16B and 17B illustrate a change in a gravity center Gx of the illuminance distribution shape of the entire diffusion plate 41 in each time point in the middle of carrying out the performance and a change in the longitudinal direction of the diffusion plate 41. FIGS. 16C and 17C illustrate a change in a gravity center Gy of the illuminance distribution shape of the entire diffusion plate 41 in each time point in the middle of carrying out the performance and in the illuminance direction of the diffusion plate 41.

Figure 17A:
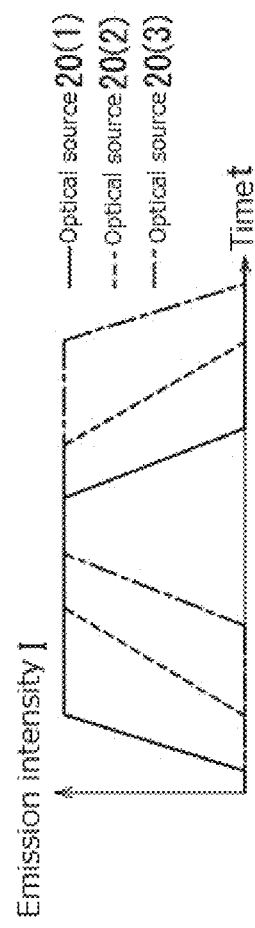

In a case where the emission intensity of each of the optical sources $20(1)$ to $20(3)$ changes as illustrated in FIG. 16A and FIG. 17A at the time of carrying out the performance on an optical flow in the diffusion plate 41, a change in a gravity center Gx of the illuminance distribution shape of the entire diffusion plate 41 and in the illuminance direction of the diffusion plate 41 is made in the same way (refer to FIG. 16B and FIG. 17B).

On the other hand, a change in the gravity center Gy of the illuminance distribution shape of the entire diffusion plate 41 and in the illuminance direction of the diffusion plate 41 increases simply and then, decreases in FIG. 16C, and in FIG. 17C, there is a region A where while the emission intensity is increasing toward the maximum illuminance, the emission intensity temporally changes from an increasing state to a decreasing state and there is a region B where while the emission intensity is decreasing from the maximum illuminance, the emission intensity temporally changes from a decreasing state to an increasing state.

In FIGS. 16A to 16C and FIGS. 17A to 17C, when the illumination performance is observed, in FIGS. 16A to 16C the optical flow is smooth and in FIGS. 17A to 17C, the optical flow flickers and looks horrible.

Figure 18B:
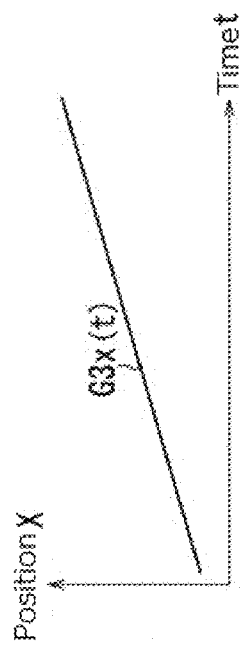
FIGS. 18A to 18C are diagrams explaining a relation between a change in the gravity center in the illuminance distribution of the diffusion plate and the emission intensity of the optical source according to the second embodiment.
Figure 18C:
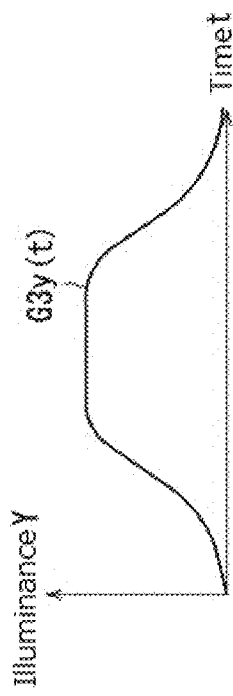
Figure 18A:
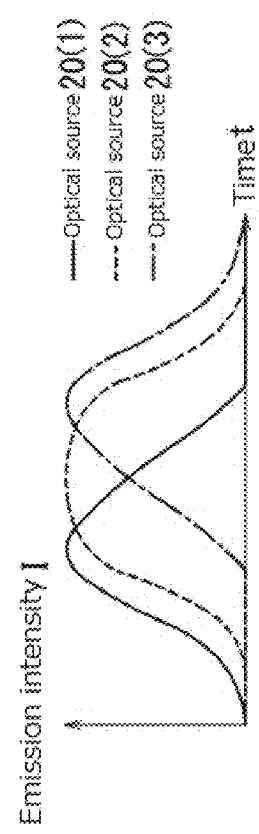

Therefore, as illustrated in FIGS. 18A to 18C, the schedule Sc is defined such that a change in a gravity center Gx of the illuminance distribution shape of the entire diffusion plate 41 in each time point in the middle of carrying out the performance and in the longitudinal direction of the diffusion plate 41 linearly increases in a constant ratio (refer to FIG. 18B), and a change in a gravity center Gy of the illuminance distribution shape of the entire diffusion plate 41 in each time point in the middle of carrying out the performance and in the illuminance direction of the diffusion plate 41 is successively made in the curved shape without flexion points (refer to FIG. 18C). As a result, the flickering characteristics of the light at the time of carrying out the performance on the optical flow are eliminated.

Figure 19B:
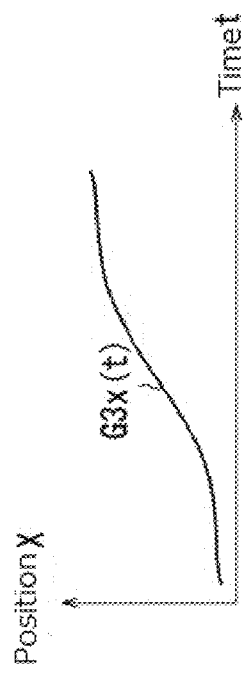
FIGS. 19A to 19C are diagrams explaining a relation between a change in the gravity center in the illuminance distribution of the diffusion plate and the emission intensity of the optical source according to the second embodiment.
Figure 19C:
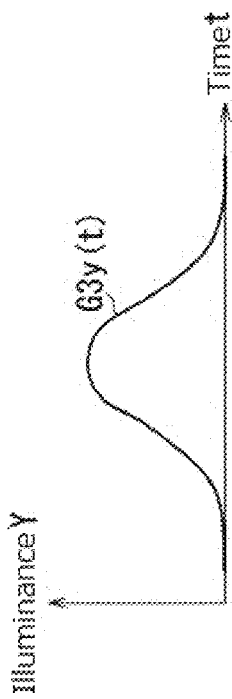
Figure 19A:
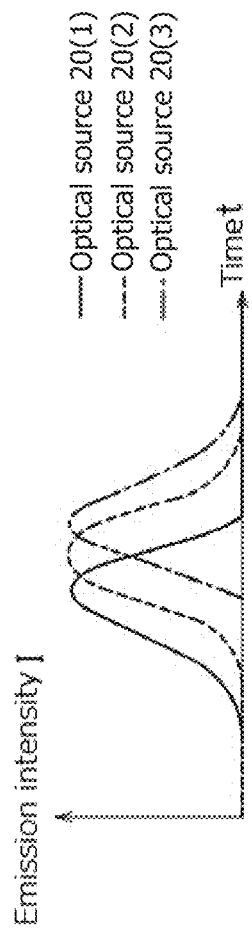

Further, as illustrated in FIGS. 19A to 19c, the schedule Sc is defined such that a change in a gravity center Gx of the illuminance distribution shape of the entire diffusion plate 41 in each time point in the middle of carrying out the performance and in the longitudinal direction of the diffusion plate 41 successively increases in a curved shape without flexion points (refer to FIG. 19B), and a change in a gravity center Gy of the illuminance distribution shape of the entire diffusion plate 41 in each time point in the middle of carrying out the performance and in the illuminance direction of the diffusion plate 41 are successively made in the curved shape without flexion points (refer to FIG. 19C). As a result, the flickering characteristics of the light at the time of carrying out the performance on the optical flow are eliminated.

Figure 20:
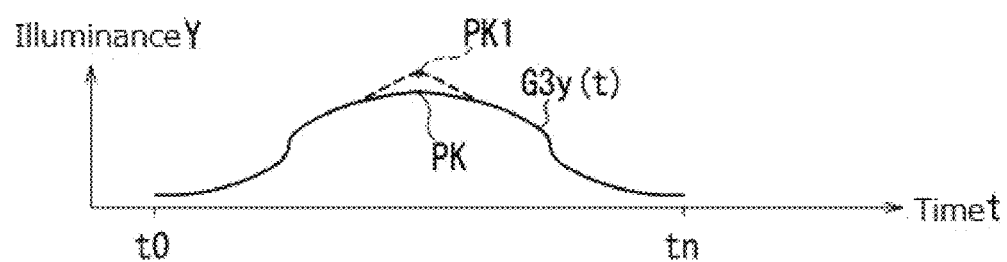
FIG. 20 is a diagram explaining a change in a position of the gravity center in the illuminance distribution of the diffusion plate in an illuminance direction according to the second embodiment.

It should be noted that as illustrated in FIG. 20, in a case of changing over time a position of the gravity center Gy in the diffusion plate 41 in the illuminance direction along a curve successively changing without flexion points in the half way, it is preferable that a peak Pk where the illuminance is the highest is positioned in a curved region where a change in the illuminance is small.

This is because when the peak Pk is positioned in a region illustrated in a broken line in FIG. 20 where a change in the illuminance is large and the change in the illuminance becomes large across the peak Pk, the flickering characteristics are possibly generated.

Thus (7) in the schedule SC, the light-up/light-out state of each of the plurality of optical sources 20(1) to 20(3) and the emission intensity of each of the optical source 20(1) to 20(3) to be lit up are set based upon a temporal change in the longitudinal direction of the diffusion plate 41 in the gravity center Gx of the illuminance distribution shape in the entire diffusion plate 41 in each time point in the middle of carrying out the performance and a temporal change in the magnitude direction of the illuminance in the gravity center Gy of the illuminance distribution shape in the entire diffusion plate 41 in each time point in the middle of carrying out the performance, and for realizing both of the temporal change in the gravity center Gx of the preset illuminance distribution shape in the longitudinal direction of the diffusion plate 41 and the temporal change in the gravity center Gy of the preset illuminance distribution shape in the magnitude direction of the illuminance, the light-up/light-out state of each of the plurality of optical source 20(1) to optical source 20(3) and the emission intensity of each of the optical source 20(1) to the optical source 20(3) to be lit up in each time point in the middle of carrying out the performance are set.

With this configuration also, since the travel of the light at the time of carrying out the performance is smooth, the effect of the performance on the optical travel can improve.

Further, (8) the temporal change in the gravity center Gx of the illuminance distribution shape in the longitudinal direction of the diffusion plate 41 and the temporal change in the gravity center Gy of the illuminance distribution shape in the magnitude direction of the illuminance are set to successively increase or decrease in the curved shape or in the linear shape without flexion points in each time point in the middle of carrying out the performance.

With this configuration, the flickering characteristics of the light at the time of carrying out the performance on the optical flow can be eliminated to further improve the effect of the performance on the optical travel.

MODIFICATION

Figure 21:
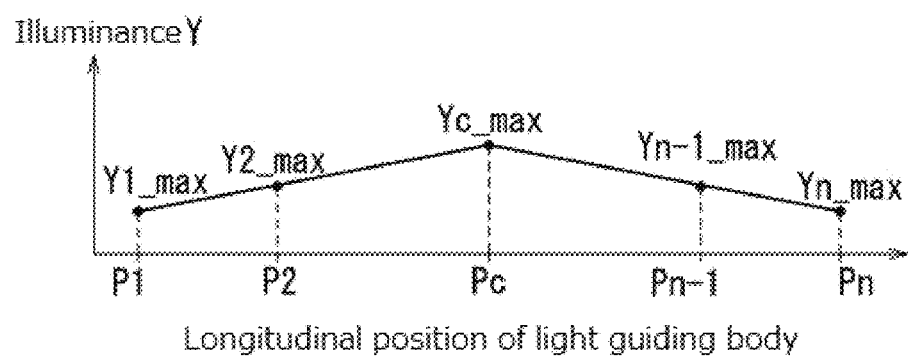
FIG. 21 is a diagram explaining an illuminance distribution of the diffusion plate in a longitudinal direction according to the second embodiment.

Further, it is preferable to set the emission intensity of each of the optical sources 20(1) to 20(n) such that in the diffusion plate 41 in each time point in the middle of carrying out the performance, the illuminance of the diffusion plate 41 in each position in the longitudinal direction is maximized in a center position Pc in the longitudinal direction, and the illuminance decreases from the center position Pc toward a position P1-side and a position Pn-side (refer to FIG. 21).

(9) The entire illuminance in the diffusion plate 41 in each time point in the middle of carrying out the performance is set to be maximized in the intermediate position in the longitudinal direction and decrease as farther from the intermediate position (refer to FIG. 21).

With this configuration, since the illuminance does not vary largely in the longitudinal direction on the emission surface of the diffusion plate 41, the travel of the light becomes smoother.

Fourth Embodiment

FIGS. 22A to 22D are time charts for lighting-up/lighting-out of each of three optical sources 20(1), 20(2) and 20(3) at the time of carrying out performance on optical extension and performance on optical contraction in the diffusion plate 41 having the three optical sources 20(1), 20(2) and 20(3).

FIG. 22A is a time chart in a case of carrying out the performance in the method according to the present embodiment, FIG. 22B illustrates a change in an entire average illuminance (Yn_avg) in the diffusion plate 41 in the middle of carrying out the performance along the time chart illustrated in FIG. 22A, FIG. 22C is a time chart in a case of carrying out the performance based upon the control according to a general conventional example, and FIG. 22D illustrates a change in an entire average illuminance (Yn_avg) in the diffusion plate 41 in the middle of carrying out the performance along the time chart illustrated in FIG. 22C.

As illustrated in FIG. 22C, according to the conventional performance, in a case of carrying out the performance on optical extension and the performance on optical contraction in the diffusion plate 41, timing of lighting-up/lighting-out of each of the optical sources 20(1), 20(2) and 20(3) is shifted by a predetermined time $\Delta t$ without considering an increase/decrease period $\Delta tA$ of the emission intensity.

In this case, the emission intensity of each of the optical sources 20(1) to 20(3) changes as illustrated in FIG. 22C. As a result, the average illuminance (Yn_avg) of the diffusion pate 41 while carrying out the performance changes in a linear shape having flexion points as illustrated in FIG. 22D, and therefore, the travel of the light does not smooth.

In regard to this point, the present inventors have found out that as illustrated in FIG. 22A, by controlling a change in the emission intensity of each of the optical sources 20(1), 20(2) and 20(3) in consideration of the increase/decrease period $\Delta tA$ of the emission intensity of each of the optical sources 20(1), 20(2) and 20(3), the travel of the light becomes smooth.

Specifically the timing of lighting-up/lighting-out of each of the optical sources 20(1), 20(2) and 20(3) is shifted by a predetermined time $\Delta tB$, and the emission intensity of each of the optical sources 20(1), 20(2) and 20(3) is controlled to reach specified intensity in a predetermined time $\Delta tA$.

In addition, it is found out that by setting the time $\Delta tB$ for shifting the timing of lighting-up/lighting-out to be equal to or less than the predetermined time ΔtA and equal to or more than a half of the predetermined time ΔtA, the travel of the light becomes smooth.

By controlling the light-up/light-out state of each of the optical sources 20(1), 20(2) and 20(3) and a change in the emission intensity at the lighting-up and lighting-out according to the time chart illustrated in FIG. 22A, the average illuminance (Yn_aveg) of the diffusion plate 41 while carrying out the performance is, as illustrated in FIG. 22B, configured such that flexion points in the middle of changing the emission intensity are more minimal as compared to FIG. 22D.

Thereby, it is found out that a change in the average illuminance (Yn_aveg) of the diffusion plate 41 while carrying out the performance becomes smooth, and as a result, the travel of the light becomes smooth.

Thus,

(10) the illuminating device comprises:
the plurality of optical sources 20(1) to optical sources 20(n);
the band-shaped diffusion plate 41 having the plurality of emission region W(1) to emission region W(n) corresponding on a one-to-one basis to the plurality of the optical source 20(1) to the optical source 20(n) respectively; and
the control unit 30 configured to control lighting-up/lighting-out and emission intensity of each of the optical source 20(1) to the optical source 20(n) based upon the schedule SC stored in the memory unit 35 and at the time of carrying out performance on an optical travel by the diffusion plate 41,
each of the emission region W(2) to the emission region W(n−1) in the plurality of emission region W(1) to emission region W(n) having the predetermined length L in the longitudinal direction of the diffusion plate 41, and the emission region W(1) and the emission region W(n) each having the predetermined length L/2,
in the diffusion plate 41 the plurality of emission region W(1) to emission region W(n) being provided to successively extend in the longitudinal direction, and
in the diffusion plate 41, each of the emission region W(2) to the emission region W(n−1) between the emission region W(1) positioned in the one end 410 and the emission region W(n) positioned in the other end 411 in the longitudinal direction being arranged to overlap the other emission region adjacent in the longitudinal direction in a predetermined range (range of a length of L/2) of both side portions in the longitudinal direction, wherein
in the schedule SC,
at the time of performing the light-up/light-out of each of the optical sources 20(1) to 20(n) in the middle of carrying out the performance, transition control of changing the emission intensity of the optical source 20 to be lit up/lit out to the set emission intensity is set to be executed, and
in an optical source to be lit up/lit out next after the lit-up/lit-out optical source, the transition control is set to be executed after an elapse of a delay time ΔtB equal to or less than time ΔtA required for the transition control and equal to or more than a half (ΔtA/2) of the time required for the transition control.

With this configuration, a change in the average illuminance (Yn_aveg) of the diffusion plate 41 while carrying out the performance becomes smooth, and it is possible to cause the light to be visualized in such a manner as to smoothly travel.

Fifth Embodiment

FIGS. 23A to 23E are diagrams explaining an illuminating device 1A according to a fifth embodiment, and explaining a case of the illuminating device 1A having a total of seven optical sources 20.

FIG. 23A is a plan view of the illuminating device 1A as viewed from an emission surface side of light, and FIG. 23B is a plan view of the illuminating device 1A with a light blocking plate 40 having the diffusion plate 41 removed from the illuminating device 1A illustrated in FIG. 23A and is a diagram illustrating an outline of the light blocking plate 40 in a broken line. FIG. 23C is a cross section taken in a direction of arrows A-A in FIG. 23A, FIG. 23D is an enlarged diagram of a B-B cross-section surface in FIG. 23A, and FIG. 23E is a diagram explaining a shape of an emission region W(2).

Here, the illuminating device 1A according to the fifth embodiment differs from the aforementioned illuminating device 1 according to the first embodiment in a point of being provided with a plurality of light guiding members 11.

Therefore, in the following explanation, an explanation will be made mainly of points different from the aforementioned illuminating device 1, and points in common therewith will be explained as needed.

In addition, in a case where it is required to distinguish between a plurality of optical sources 20, an explanation will be made by attaching a parenthesis with an ordinal number for distinguishing after a sign, such as optical source 20(1), ... 20(n). The emission regions "W" and the light guiding members 11 will be described in the same way.

[Illuminating Device 1A]

As illustrated in FIGS. 23A to 23E, the illuminating device 1A includes a plurality of optical sources 20(1) to 20(7), a plurality of light guiding members 11(1) to 11(7) corresponding on a one-to-one basis to the plurality of optical sources 20(1) to 20(7), and a band-shaped diffusion plate 41 having a plurality of emission regions W(1) to W(7) corresponding on a one-to-one basis to the plurality of light guiding members 11(1) to 11(7).

It should be noted that in FIGS. 23A to 23E, a control unit configured to control lighting-up/lighting-out and an emission intensity of each of the optical sources 20(1) to 20(7) is omitted in illustration.

The band-shaped diffusion plate 41 is provided in the light blocking plate 40 formed in a rectangular shape in planar view in a position closer to one side in the width direction (upper-lower direction in FIG. 23A) thereof.

In the diffusion plate 41, the emission regions W(1) to W(7) of the light emitted from the optical sources 20(1) to 20(7) respectively are set to successively extend in the longitudinal direction, and the light guiding members 11(1) to 11(7) are provided under the light blocking plate 40 to guide the light emitted from the optical sources 20(1) to 20(7) respectively to the associated emission regions W(1) to W(7).

In planar view, each of the light guiding members 11(1) to 11(7) is a linear member having a cross-sectional surface in a rectangular shape (refer to FIGS. 23C and 23D).

As illustrated in FIG. 23B, the light guiding members 11(1) to 11(7) are provided at an inclination of a predetermined angle θ to a center line Lm along the longitudinal direction of the diffusion plate 41 and are arranged to line up in a radial direction of the center line Lm.

One end 110 of each of the light guiding members 11(1) to 11(7) in the longitudinal direction is formed in a flat surface, and in planar view, the light guiding members 11(1)

to 11(7) are provided such that a position of the one end 110 is placed in a predetermined position spaced from each of the associated optical sources 20(1) to 20(7).

The optical sources 20(1) to 20(7) line up by predetermined intervals on the substrate 2 arranged under the light blocking plate 40.

Therefore, the one end 110 of each of the light guiding members 11(1) to 11(7) is provided as an incident face of light emitted from each of the optical sources 20(1) to 20(7) corresponding thereto.

The light guiding members 11(1) to 11(7) each are formed in a resin material having a refractive index larger than air, and the light incident to the light guiding members 11(1) to 11(7) from the one end 110 in the longitudinal direction is guided to the other 111-side while reflecting therein.

In planar view, the light guiding members 11(1) to 11(7) are provided across the diffusion plate 41 from one side to the other side of the center line Lm, and the other end 111 is positioned closer to the outside than a side part 41a in the other side of the diffusion plate 41.

In the light guiding members 11(1) to 11(7), a region where the light guiding members 11(1) to 11(7) and the diffusion plate 41 overlap in planar view is provided as an emission surface of the light guided toward the other side 111-side inside the light guiding members 11(1) to 11(7), and a surface 112 at the opposite to the diffusion plate 41 in the overlapping region is provided with concave/convex (unillustrated) for changing a traveling direction of light reflected on the surface 112 to a direction toward the emission surface.

A predetermined area of a region where the light emitted from each emission surface of the light guiding members 11(1) to 11(7) in the diffusion plate 41 passes is provided as the emission region W(1) to the emission region W(7) corresponding on a one-to-one basis to the light guiding members 11(1) to 11(7).

In the present embodiment, the emission region W(1) and the emission region W(7) positioned in one end 410 and the other end 411 of the diffusion plate 41 in the longitudinal direction have a triangular shape in planar view, and the emission region W(2) to the emission region W(6) positioned between the emission region W(1) and the emission region W(7) positioned in the one end 410 and the other end 411 have a diamond shape in planar view.

In addition, when the plurality of emission region W(1) to emission region W(7) successively extend to form a band-shaped region, this formed region is formed with an area substantially matching the diffusion plate 41.

The emission region W(1) to the emission region W(7) each have the same length L in the longitudinal direction other than the emission region W(1) and the emission region W(7) positioned in the one end 410 and the other end 411 in the longitudinal direction of the diffusion plate 41, and the emission region W(1) and the emission region W(7) each have half a length of each of the other emission regions W(2) to W(6).

Therefore, the emission region W(1) to the emission region W(7) in the diffusion plate 41 each are provided to be offset by a predetermined length L/2 from the one end 410-side to the other end 411-side in the longitudinal direction of the diffusion plate 41.

Here, a shape of each of the emission region W(2) to the emission region W(6) will be specifically explained by taking the emission region W(2) as an example.

As illustrated in FIG. 23E, in the emission region W(2) in the diffusion plate 41, one side (left side in the drawing) region Ra and the other side (right side in the drawing) region Rb across a center position P2 of the diffusion plate 41 in the longitudinal direction each are formed by a length L/2 covering the other emission region W(1) adjacent in the one side and the other emission region W(3) adjacent in the other side.

The emission region W(2) is contracted in width such that a width Wx is maximized in the center position P2 in the longitudinal direction, is the narrower as closer to the emission region W(1) or the emission region W(3) away from the center position P2, and becomes zero in a point of reaching the position P1 of the emission region W(1) and the center position P2 of the emission region W(3).

In planar view, the emission region W(1) has a triangular shape in which the width Wx is maximized in the position P1 overlapping the one end 410 of the diffusion plate 41 and the width Wx becomes zero in the center position P2 of the emission region W(2). The emission region W(1) has a shape not to overlap the one side region Ra of the emission region W(2) and to match the other side region Rb of the emission region W(2).

Incidentally, the emission region W(7) has such a shape as to reverse the emission region W(1) in the upper-lower direction across the center line Lm in FIG. 23B.

Therefore, in each of the emission region W(1) and the emission region W(7) in the diffusion plate 41, the illuminance Y of the light to be emitted is the lower as the farther from the one end 410 or the other end 411, and in each of the emission region W(2) to the emission region W(6), the illuminance is maximized in the center position P2 to the center position P6 in the longitudinal direction, and the illuminance is the lower as the farther from the center position P2 to the center position P6.

As a result, also in the illuminating device 1A according to the present embodiment, by controlling the lighting-up/lighting-out state of the optical source 20(1) to the optical source 20(7) and the emission intensity of the optical source 20 to be lit up, any position (region) in the diffusion plate 41 can be made brighter or darker than the other position (region), and the performance by the light can be carried out by displacing the bright position or dark position in the longitudinal direction of the diffusion plate 41.

Thus,

(12) the diffusion plate 41 is formed in such a shape that, each of the emission region W(2) to the emission region W(6) positioned between the emission region W(1) positioned in the one end 410 and the emission region W(7) positioned in the other end 411 in the longitudinal direction has the width Wx maximized in the center position in the longitudinal direction (in a case of the emission region (2), in the center position P2), and is configured such that the width of each of the one side region Ra and the other side region Rb in the center position in the longitudinal direction is the narrower as the farther from the center position, and each of the emission region W(2) to the emission region W(6) positioned between the emission region W(1) positioned in the one end 410 and the emission region W(7) positioned in the other end 411 in the longitudinal direction is configured such that the one side region Ra and the other side region Rb are arranged to line up in the width direction of the diffusion plate 41 to the other side region Rb and the one side region Ra in the other emission region adjacent in the longitudinal direction respectively.

With this configuration, in each of the emission region W(2) to the emission region W(6), the one side region Ra and the other side region Rb in the center position are arranged to line up in the width direction of the diffusion plate 41 to the other side region Rb and the one side region Ra in the other emission region adjacent in the longitudinal direction respectively. Therefore, at the time of changing the emission regions to emit the light in order in the longitudinal direction for the performance on the optical flow, the travel of the light in the diffusion plate 41 can be visualized more smoothly.

It should be noted that preferably also in the illuminating device 1A, as similar to a case of the aforementioned illuminating device 1, in the schedule SC at the time of carrying out the performance on the optical travel in the diffusion plate 41, for realizing the temporal change Yn_avg (t) of the preset average illuminance, the light-up/light-out state of each of the plurality of optical sources 20(1) to 20(7) and the emission intensity of the optical source to be lit up in each time point in the middle of carrying out the performance are set based upon the average illuminance Y_avg in the illuminance distribution of the entire diffusion plate 41 found by combining the illuminances of the lights emitted from the plurality of emission region W(1) to emission region W(7) respectively, and/or for realizing the temporal change in the gravity center of the preset illuminance distribution shape, the light-up/light-out state of each of the plurality of optical sources 20(1) to 20(7) and the emission intensity of the optical source to be lit up in each time point in the middle of carrying out the performance are set based upon the gravity center G of the illuminance distribution shape when an illuminance distribution of the entire diffusion plate 41 is expressed by setting a position of the diffusion plate 41 in the longitudinal direction to an "x" direction and a magnitude of the illuminance in each position in the longitudinal direction to a "y" direction.

With this configuration also, it is possible to visualize the light in such a manner as to travel smoothly.

In addition, also in a case of the illuminating device 1A, by setting the average illuminance Yn_avg of the diffusion plate 41 and the gravity center G of the illuminance distribution shape to successively increase or decrease in the curved shape or linearly without flexion points in the schedule, it is possible to visualize the light in such a manner as to travel more smoothly.

While only the selected embodiments have been chosen to illustrate the present invention, it will be apparent to those skilled in the art from this disclosure that various changes and modifications can be made therein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. An illuminating device comprising:
    a plurality of optical sources;
    a band-shaped diffusion plate having a plurality of emission regions corresponding on a one-to-one basis to the plurality of optical sources respectively; and
    a control unit configured to control lighting-up/lighting-out and an emission intensity of each of the optical sources based upon a schedule at a time of carrying out performance on an optical travel by the diffusion plate, the plurality of emission regions each having a predetermined length in a longitudinal direction of the diffusion plate and being provided to successively extend in the longitudinal direction, wherein:
    in the schedule, a light-up/light-out state of each of the plurality of optical sources and an emission intensity of an optical source to be lit up are set based upon an average illuminance in an illuminance distribution of the entire diffusion plate found by combining illuminances of lights emitted from the plurality of emission regions respectively, and
    for realizing a temporal change of the average illuminance preliminarily set, the light-up/light-out state of each of the plurality of optical sources and the emission intensity of the optical source to be lit up in each of a plurality of time points in a middle of carrying out the performance are set.

2. The illuminating device according to claim 1, wherein the temporal change in the average illuminance is set to successively increase or decrease in a curved shape or in a linear shape without flexion points in each time point in the middle of carrying out the performance.

3. The illuminating device according to claim 2, wherein in the diffusion plate in each time point in the middle of carrying out the performance, the emission intensity of the diffusion plate in the longitudinal direction is set to successively increase or decrease in the linear shape without flexion points from one end toward the other end in the longitudinal direction.

4. The illuminating device according to claim 1, wherein in the diffusion plate in each time point in the middle of carrying out the performance, the emission intensity of the diffusion plate in the longitudinal direction is set to successively increase or decrease in a linear shape without flexion points from one end toward the other end in the longitudinal direction.

5. The illuminating device according to claim 1, wherein:
    in the schedule,
    at the time of performing the light-up/light-out of each of the optical sources in the middle of carrying out the performance, transition control of changing the emission intensity of the optical source to be lit up/lit out to the set emission intensity is set to be executed, and
    in an optical source to be lit up/lit out next after the lit-up/lit-out optical source, the transition control is set be executed after an elapse of a delay time equal to or less than time required for the transition control and equal to or more than a half of the time required for the transition control.

6. The illuminating device according to claim 1, wherein in the diffusion plate, each of the emission regions between an emission region positioned in one end and an emission region positioned in another end in the longitudinal direction is arranged to overlap the other emission region adjacent in the longitudinal direction in a predetermined range of both side portions in the longitudinal direction.

7. The illuminating device according to claim 1, wherein:
    the diffusion plate is formed in such a shape that, each of the emission regions positioned between the emission region positioned in one end and the emission region positioned in another end in the longitudinal direction is maximized in width in a center position in the longitudinal direction, and a width in one side region and a width in another side region in the center position in the longitudinal direction are the narrower as the farther from the center position, and
    each of the emission regions positioned between the emission region positioned in the one end and the emission region positioned in the other end in the longitudinal direction is configured such that the one side region and the other side region are arranged to line up in a width direction of the diffusion plate to the other side region and the one side region in the other emission region adjacent in the longitudinal direction respectively.

8. An illuminating device comprising:

a plurality of optical sources;

a band-shaped diffusion plate having a plurality of emission regions corresponding on a one-to-one basis to the plurality of the optical sources respectively; and a control unit configured to control lighting-up/lighting-out and an emission intensity of each of the optical sources based upon a schedule at a time of carrying out performance on an optical travel by the diffusion plate, each of the plurality of emission regions having a predetermined length in a longitudinal direction of the diffusion plate, and being provided to successively extend in the longitudinal direction, wherein in the schedule, a light-up/light-out state of each of the plurality of optical sources and the emission intensity of the optical source to be lit up are preset based upon a gravity center of an illuminance distribution shape when an illuminance distribution of the entire diffusion plate found by combining the illuminances of the lights emitted from the plurality of emission regions respectively is expressed in the illuminance distribution shape by setting a position of the diffusion plate in the longitudinal direction to an "x" direction and a magnitude of the illuminance in each position in the longitudinal direction to a "y" direction, and for realizing a temporal change in the gravity center of the preset illuminance distribution shape in the longitudinal direction, the light-up/light-out state of each of the plurality of optical sources and the emission intensity of the optical source to be lit up in each of a plurality of time points in a middle of carrying out the performance are set.

9. The illuminating device according to claim 8, wherein the temporal change in the gravity center of the illuminance distribution shape in the longitudinal direction is set to successively increase or decrease in a curved shape or in a linear shape without flexion points in each time point in the middle of carrying out the performance.

10. The illuminating device according to claim 9, wherein:

the emission intensity of each of the plurality of optical sources set in the schedule is an emission intensity calculated based upon the gravity center of the illuminance distribution shape, at a time of setting the emission intensity of each of the plurality of optical sources in the schedule, in a case there is an optical source in which the emission intensity calculated based upon the gravity center of the illuminance distribution shape is minus, based upon a gravity center of the illuminance distribution shape expressed from an illuminance distribution in an emission region corresponding to the other optical source excluding the optical source the emission intensity of which is minus, an emission intensity of the other optical source is set and an emission intensity of the optical source the calculated emission intensity of which is minus is set to zero.

11. The illuminating device according to claim 9, wherein:

in the schedule, the light-up/light-out state of each of the plurality of optical sources and the emission intensity of the optical source to be lit up are set based upon a temporal change in the gravity center in the longitudinal direction and a temporal change in a magnitude direction of the illuminance in the gravity center of the illuminance distribution shape in each time point in the middle of carrying out the performance, and for realizing both of the temporal change in the gravity center of the preset illuminance distribution shape in the longitudinal direction and the temporal change in the magnitude direction of the illuminance in the gravity center of the preset illuminance distribution shape, the light-up/light-out state of each of the plurality of optical sources and the emission intensity of the optical source to be lit up in each time point in the middle of carrying out the performance are set.

12. The illuminating device according to claim 11, wherein the temporal change in the gravity center of the illuminance distribution shape in the longitudinal direction and the temporal change in the magnitude direction of the illuminance in the gravity center of the illuminance distribution shape are set to successively increase or decrease in a curved shape or in a linear shape without flexion points in each time point in the middle of carrying out the performance.

13. The illuminating device according to claim 12, wherein in the diffusion plate in each time point in the middle of carrying out the performance, the illuminance distribution in the entire diffusion plate is set to be maximized in an intermediate position in the longitudinal direction and decreases as farther from the intermediate position.

14. The illuminating device according to claim 8, wherein:

the emission intensity of each of the plurality of optical sources set in the schedule is an emission intensity calculated based upon the gravity center of the illuminance distribution shape, at a time of setting the emission intensity of each of the plurality of optical sources in the schedule, in a case there is an optical source in which the emission intensity calculated based upon the gravity center of the illuminance distribution shape is minus, based upon a gravity center of the illuminance distribution shape expressed from an illuminance distribution in an emission region corresponding to the other optical source excluding the optical source the emission intensity of which is minus, an emission intensity of the other optical source is set and an emission intensity of the optical source the calculated emission intensity of which is minus is set to zero.

15. The illuminating device according to claim 8, wherein:

in the schedule, the light-up/light-out state of each of the plurality of optical sources and the emission intensity of the optical source to be lit up are set based upon a temporal change in the gravity center in the longitudinal direction and a temporal change in a magnitude direction of the illuminance in the gravity center of the illuminance distribution shape in each time point in the middle of carrying out the performance, and for realizing both of the temporal change in the gravity center of the preset illuminance distribution shape in the longitudinal direction and the temporal change in the magnitude direction of the illuminance in the gravity center of the preset illuminance distribution shape, the light-up/light-out state of each of the plurality of optical sources and the emission intensity of the optical source to be lit up in each time point in the middle of carrying out the performance are set.

16. The illuminating device according to claim 15, wherein the temporal change in the gravity center of the illuminance distribution shape in the longitudinal direction and the temporal change in the magnitude direction of the illuminance in the gravity center of the illuminance distribution shape are set to successively increase or decrease in a curved shape or in a linear shape without flexion points in each time point in the middle of carrying out the performance.

17. The illuminating device according to claim 16, wherein in the diffusion plate in each time point in the middle of carrying out the performance, the illuminance distribution in the entire diffusion plate is set to be maximized in an intermediate position in the longitudinal direction and decreases as farther from the intermediate position.

18. The illuminating device according to claim 8, wherein:
   in the schedule,
   at the time of performing the light-up/light-out of each of the optical sources in the middle of carrying out the performance, transition control of changing the emission intensity of the optical source to be lit up/lit out to the set emission intensity is set to be executed, and
   in an optical source to be lit up/lit out next after the lit-up/lit-out optical source, the transition control is set be executed after an elapse of a delay time equal to or less than time required for the transition control and equal to or more than a half of the time required for the transition control.

19. The illuminating device according to claim 8, wherein in the diffusion plate, each of the emission regions between an emission region positioned in one end and an emission region positioned in another end in the longitudinal direction is arranged to overlap the other emission region adjacent in the longitudinal direction in a predetermined range of both side portions in the longitudinal direction.

20. The illuminating device according to claim 8, wherein:
   the diffusion plate is formed in such a shape that, each of the emission regions positioned between the emission region positioned in one end and the emission region positioned in another end in the longitudinal direction is maximized in width in a center position in the longitudinal direction, and a width in one side region and a width in another side region in the center position in the longitudinal direction are the narrower as the farther from the center position, and
   each of the emission regions positioned between the emission region positioned in the one end and the emission region positioned in the other end in the longitudinal direction is configured such that the one side region and the other side region are arranged to line up in a width direction of the diffusion plate to the other side region and the one side region in the other emission region adjacent in the longitudinal direction respectively.

* * * * *